United States Patent
Nagatani et al.

(10) Patent No.: US 8,209,722 B2
(45) Date of Patent: Jun. 26, 2012

(54) INFORMATION PROCESSING APPARATUS, INFORMATION PROCESSING METHOD AND PROGRAM

(75) Inventors: Hiroshi Nagatani, Tokyo (JP); Yuki Murata, Tokyo (JP); Kenji Ozawa, Chiba (JP); Maki Kato, Tokyo (JP); Hirotaka Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/184,602

(22) Filed: Aug. 1, 2008

(65) Prior Publication Data

US 2009/0044227 A1  Feb. 12, 2009

(30) Foreign Application Priority Data

Aug. 6, 2007 (JP) ................. 2007-203854

(51) Int. Cl.
  *H04N 5/445* (2011.01)
  *H04N 7/173* (2011.01)
(52) U.S. Cl. ............... 725/51; 725/46; 725/52; 725/53; 725/93
(58) Field of Classification Search .......... 725/44, 725/46, 51–53, 91, 93
  See application file for complete search history.

(56) References Cited

U.S. PATENT DOCUMENTS

| | | | |
|---|---|---|---|
| 2003/0028889 A1* | 2/2003 | McCoskey et al. | 725/91 |
| 2004/0268395 A1* | 12/2004 | Han | 725/48 |
| 2005/0251825 A1* | 11/2005 | Fukuda et al. | 725/44 |
| 2009/0044227 A1* | 2/2009 | Nagatani et al. | 725/46 |
| 2009/0158350 A1* | 6/2009 | DeCamp | 725/58 |

FOREIGN PATENT DOCUMENTS

| | | |
|---|---|---|
| JP | 10-145687 | 5/1998 |
| JP | 10-177532 | 6/1998 |
| JP | 2002-278867 | 9/2002 |
| JP | 2003-219374 | 7/2003 |
| JP | 2004-23345 | 1/2004 |
| JP | 2005-115790 | 4/2005 |
| JP | 2005-341068 | 12/2005 |
| JP | 2006-135428 | 5/2006 |
| JP | 2008-294943 | 12/2008 |
| JP | 2009-10797 | 1/2009 |

* cited by examiner

*Primary Examiner* — Kieu Oanh T Bui
(74) *Attorney, Agent, or Firm* — Oblon, Spivak, McClelland, Maier & Neustadt, L.L.P.

(57) ABSTRACT

An information processing apparatus includes a program information display controller configured to display recommendation information which relates to a recorded program, which is obtained in advance, and which is introduced in the program, and configured to display, when the recommendation information is searchable by web searching, a notification describing that the recommendation information is searchable by the web searching along with the recommendation information, and a search display controller configured to determine at least one search site in accordance with a type of the recommendation information when a user selects the searchable recommendation information and display a search dialog including the determined at least one search site as at least one candidate.

10 Claims, 14 Drawing Sheets

FIG. 4

| TYPE | ITEM | DETAILED INFORMATION | LINK | EXAMPLE |
|---|---|---|---|---|
| PROGRAM INFORMATION | PROGRAM ID | | | 20070707120000 |
| | PROGRAM START TIME | | | 2007-07-07T23:55:00 |
| | PROGRAM END TIME | | | 2007-07-07T23:55:01 |
| | BROADCAST STATION NAME | | | FUJIYAMA TV |
| | GENRE | | | DOCUMENTARY |
| | PROGRAM NAME | | | NEWS1 |
| | LAST UPDATE DATE AND TIME | | | 2007-07-07T23:55:00 |
| | PRESENCE OR ABSENCE OF SHOP INFORMATION OR PRODUCT INFORMATION | | | 0 or 1 |
| | METADATA STATUS FLAG | | | 1 or 2 |
| SECTION INFORMATION | SECTION ID | | | 20070707120000 |
| | SECTION START TIME | | | 0 |
| | SECTION END TIME | | | 56000 |
| | GENRE | | | TOPIC |
| | HEADLINE | | | OPENING |
| | MEMO | | | |
| | LAST UPDATE DATE AND TIME | | | 2007-07-07T23:55:00 |
| | SHOP INFORMATION | | | |
| | PRODUCT INFORMATION | | | |
| CM INFORMATION | CM ID | | | |
| | CM START TIME | | | 2007-07-07T23:56:00 |
| | CM END TIME | | | 2007-07-07T23:56:30 |
| | PRODUCT NAME | YES | LINK | |
| | PRODUCT URL | YES | LINK | |
| | TITLE | YES | | |
| | COMPANY NAME | YES | LINK | |
| | COMPANY URL | YES | LINK | |
| | BROADCASTING START TIME | | | |
| | ADVERTISING COPY | | | |
| | GENRE | | | |
| | SUBGENRE | | | |
| | SONG | YES | | |
| | ARTIST | YES | LINK | |
| | CD TITLE | YES | LINK | |
| | CD NUMBER | | LINK | |
| | CD RELEASE DATE | YES | | |
| | PERFORMER | YES | LINK | |

FIG. 5

| TYPE | ITEM | DETAILED INFORMATION | LINK | EXAMPLE |
|---|---|---|---|---|
| SHOP INFORMATION | SHOP ID | | | |
| | SHOP INFORMATION START TIME | | | |
| | SHOP INFORMATION END TIME | | | |
| | SHOP NAME | YES | LINK | AA ZOO |
| | PRONUNCIATION | | | EI EI DOUBUTSU-EN |
| | GENRE 1 | YES | | SHOP |
| | GENRE 2 | YES | | AMUSEMENT |
| | GENRE 3 | | | ZOO/AQUARIUM |
| | GENRE 4 | | | |
| | AREA | | | MIDDLE JAPAN |
| | POSTAL CODE | | | |
| | ADDRESS | YES | LINK | |
| | PHONE NUMBER | YES | | |
| | FAX NUMBER OF SHOP | | | |
| | SHOP URL | YES | LINK | |
| | LOCATION INFORMATION (LATITUDE) | | | |
| | LOCATION INFORMATION (LONGITUDE) | | | |
| | OPENING HOUR | | | 09:30-17:00 |
| | REGULAR HOLIDAY | | | NO HOLIDAY |
| | INTRODUCED MENU: PRICE 1 | | | ENTRANCE FEE 580 YEN |
| | INTRODUCED MENU: PRICE 2 | | | |
| | INTRODUCED MENU: PRICE 3 | | | |
| | INTRODUCED MENU: PRICE 4 | | | |
| | INTRODUCED MENU: PRICE 5 | | | |
| | MEMO | | | |
| | OUTLINE | | | |
| | PARKING | | | 0 or 1 |
| | PARKING CAPACITY | | | 100 |
| | SEATING CAPACITY | | | 22 |
| | RESERVATION | | | 0 or 1 |
| | NONSMOKING SEAT | | | 0 or 1 |
| | CREDIT CARD PAYMENT | | | 0 or 1 |
| | CARD INFORMATION | | | VISAX |
| | REFERENCE PROGRAM ID | | | |
| | LAST UPDATE DATE AND TIME | | | 2007-07-07T23:55:00 |
| PRODUCT INFORMATION | PRODUCT ID | | | |
| | PRODUCT INFORMATION START TIME | | | |
| | PRODUCT INFORMATION END TIME | | | |
| | SHOP NAME | YES | | |
| | PHONE NUMBER | | | |
| | FAX NUMBER OF SHOP | | | |
| | SELLING AGENCY URL | YES | LINK | |
| | MEMO (PRODUCT DETAIL) | | | |
| | OUTLINE | | | |
| | PRODUCT NAME | YES | LINK | |
| | PRICE | | | |
| | ISBN | YES | LINK | |
| | CD/DVD NUMBER | YES | LINK | |
| | GENRE 1 | YES | | |
| | GENRE 2 | YES | | DVD/VIDEO |
| | GENRE 3 | | | TV DRAMA |
| | GENRE 4 | | | |
| | REFERENCE PROGRAM ID | | | |
| | LAST UPDATE DATE AND TIME | | | 2007-07-07T23:55:00 |

FIG. 7

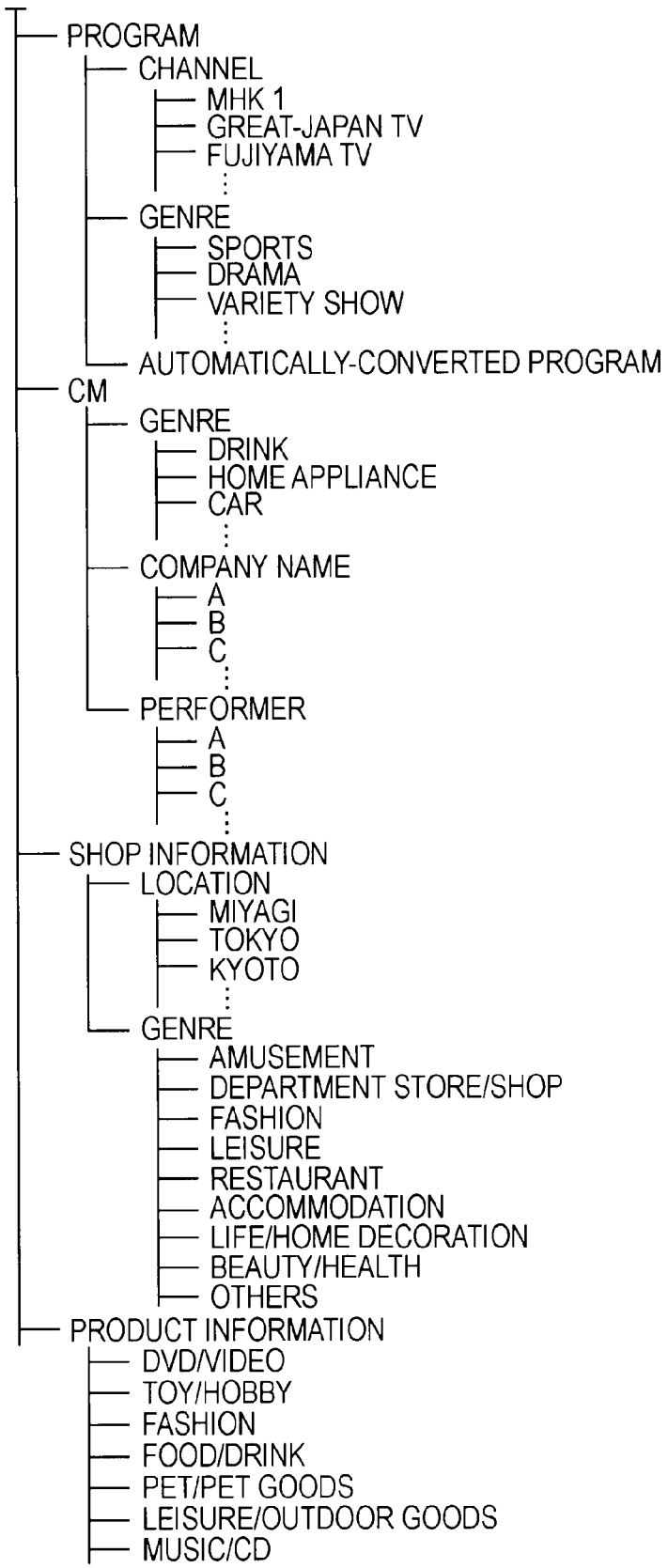
- PROGRAM
  - CHANNEL
    - MHK 1
    - GREAT-JAPAN TV
    - FUJIYAMA TV
  - GENRE
    - SPORTS
    - DRAMA
    - VARIETY SHOW
  - AUTOMATICALLY-CONVERTED PROGRAM
- CM
  - GENRE
    - DRINK
    - HOME APPLIANCE
    - CAR
  - COMPANY NAME
    - A
    - B
    - C
  - PERFORMER
    - A
    - B
    - C
- SHOP INFORMATION
  - LOCATION
    - MIYAGI
    - TOKYO
    - KYOTO
  - GENRE
    - AMUSEMENT
    - DEPARTMENT STORE/SHOP
    - FASHION
    - LEISURE
    - RESTAURANT
    - ACCOMMODATION
    - LIFE/HOME DECORATION
    - BEAUTY/HEALTH
    - OTHERS
- PRODUCT INFORMATION
  - DVD/VIDEO
  - TOY/HOBBY
  - FASHION
  - FOOD/DRINK
  - PET/PET GOODS
  - LEISURE/OUTDOOR GOODS
  - MUSIC/CD

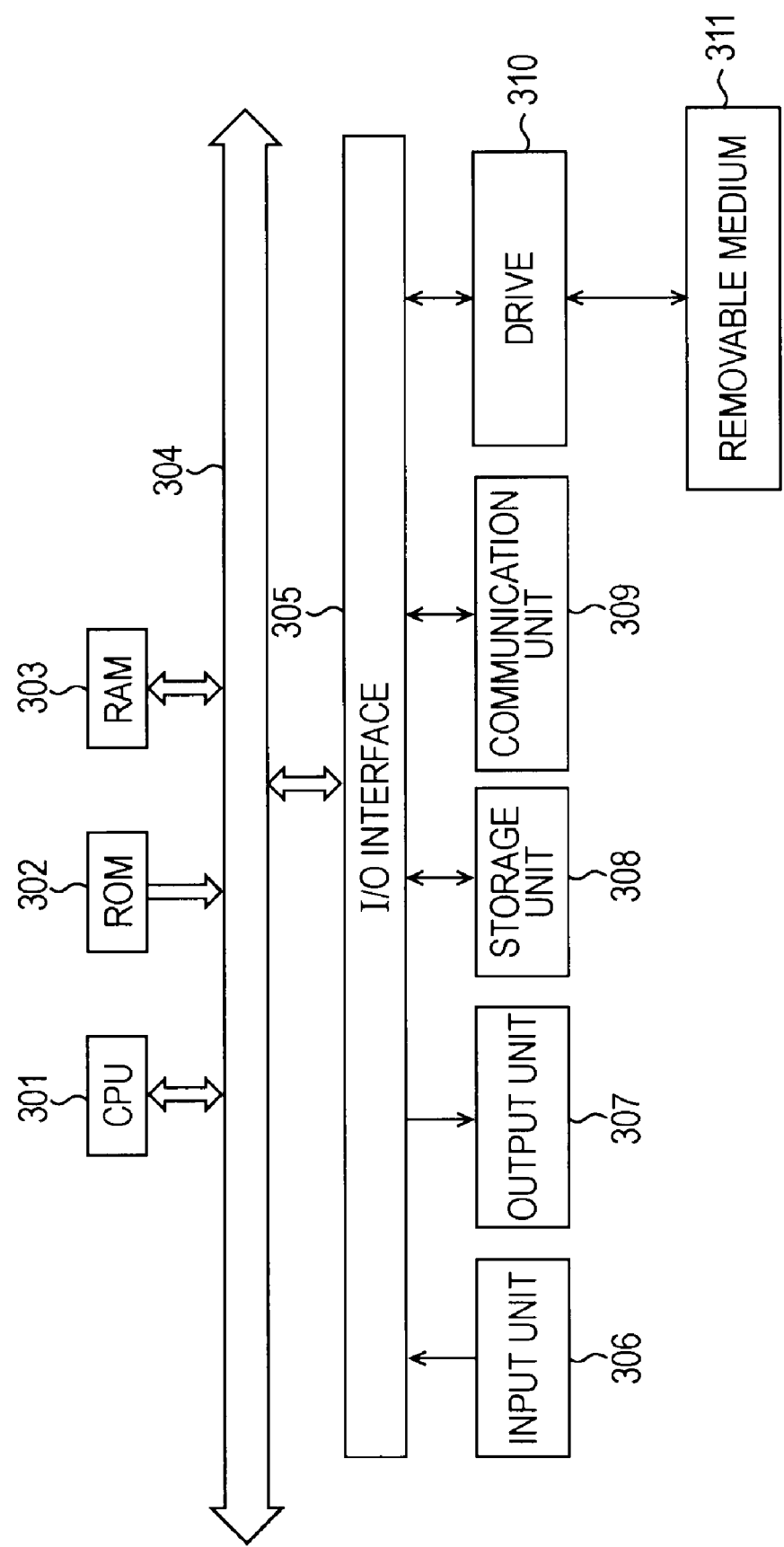

INFORMATION PROCESSING APPARATUS, INFORMATION PROCESSING METHOD AND PROGRAM

CROSS REFERENCES TO RELATED APPLICATIONS

The present invention contains subject matter related to Japanese Patent Application JP 2007-203854 filed in the Japanese Patent Office on Aug. 6, 2007, the entire contents of which are incorporated herein by reference.

BACKGROUND OF THE INVENTION

1. Field of the Invention

The present invention relates to information processing apparatuses, information processing methods, and programs, and particularly, relates to an information processing apparatus, an information processing method, and a program which are capable of rapidly obtaining appropriate information by switching search sites in accordance with a type of information to be searched, for example.

2. Description of the Related Art

Techniques of receiving and displaying EPG (electronic program guide) data have been widely spread. The EPG data included in a broadcast wave is transmitted with a predetermined time interval and is received using a television receiver so as to be displayed as an electronic program table separately from programs.

In recent years, in addition to techniques of displaying text information included in the EPG data, techniques of performing search operations using the text information as a keyword through search engines via the Internet and displaying results of the search operations have been proposed (for example, Japanese Unexamined Patent Application Publication No. 2004-23345).

SUMMARY OF THE INVENTION

However, when text information included in EPG data is merely used as a keyword for a search operation, a result of the search operation to be displayed may be different from a result in which a user desires to obtain.

Specifically, it is assumed that the user desires to purchase a CD (compact disc) or a DVD (digital versatile disc), for example, and searches the Internet for the desired CD or the DVD on the basis of a song title or a name of an artist. In this case, when the user uses the song title or the name of the artist as a keyword for a search operation, although websites including the keyword are displayed, websites of online shops where the CD or the DVD of the artist has been sold may not be displayed. Therefore, after the search operation, the user has to further access one of the websites of the online shops where the CD or the DVD of the artist has been sold for example, and has to search the website of the online shop for the CD or the DVD using the song title or the name of the artist as a keyword.

It is desirable to provide an information processing apparatus, an information processing method, and a program which are capable of rapidly obtaining appropriate information by switching search sites in accordance with a type of information to be searched.

According to an embodiment of the present invention, there is provided an information processing apparatus including a program information display controller configured to display recommendation information which relates to a recorded program, which is obtained in advance, and which is introduced in the program, and configured to display, when the recommendation information is searchable by web searching, a notification describing that the recommendation information is searchable by the web searching along with the recommendation information, and a search display controller configured to determine at least one search site in accordance with a type of the recommendation information when a user selects the searchable recommendation information and display a search dialog including the determined at least one search site as at least one candidate.

According to another embodiment of the present invention, the information processing method includes displaying recommendation information which relates to a recorded program, which is obtained in advance, and which is introduced in the program, and displaying, when the recommendation information is searchable by web searching, a notification describing that the recommendation information is searchable by the web searching along with the recommendation information in a reproduction instruction screen, and determining at least one search site in accordance with a type of the recommendation information when a user selects the searchable recommendation information and displaying a search dialog including the determined at least one search site as at least one candidate.

According to a further embodiment of the present invention, there is provided a program which causes a computer to execute processing including displaying recommendation information which relates to a recorded program, which is obtained in advance, and which is introduced in the program, and displaying, when the recommendation information is searchable by web searching, a notification describing that the recommendation information is searchable by the web searching along with the recommendation information in a reproduction instruction screen, and determining at least one search site in accordance with a type of the recommendation information when a user selects the searchable recommendation information and displaying a search dialog including the determined at least one search site as at least one candidate.

According to a still further embodiment of the present invention, recommendation information which relates to a recorded program, which is obtained in advance, and which is introduced in the program is displayed, and, when the recommendation information is searchable by web searching, a notification describing that the recommendation information is searchable by the web searching along with the recommendation information is displayed in a reproduction instruction screen, and at least one search site is determined in accordance with a type of the recommendation information when a user selects the searchable recommendation information and a search dialog including the determined at least one search site as at least one candidate is displayed.

Accordingly, a user appropriately and rapidly obtains desired information through a search operation.

BRIEF DESCRIPTION OF THE DRAWINGS

FIG. 4 is a diagram illustrating an example of detailed information of a CM, for example;

FIG. 5 is a diagram illustrating examples of shop information and product information;

FIG. 7 is a diagram illustrating items displayed in item category screen;

FIG. 16 is a block diagram illustrating a configuration example of a computer according to an embodiment of the present invention.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus (an image display apparatus 1 shown in FIG. 1, for example) according to an embodiment of the present invention includes a program information display controller (a content metadata reproducing unit 62 shown in FIG. 1, for example) configured to display recommendation information which relates to a recorded program, which is obtained in advance, and which is introduced in the program, and display, when the recommendation information is searchable by web searching, a notification describing that the recommendation information is searchable by the web searching along with the recommendation information, and a search display controller (a browser controller 29 shown in FIG. 1, for example) configured to determine at least one search site in accordance with a type of the recommendation information when a user selects the searchable recommendation information and display a search dialog including the determined at least one search site as at least one candidate.

Figure 8:
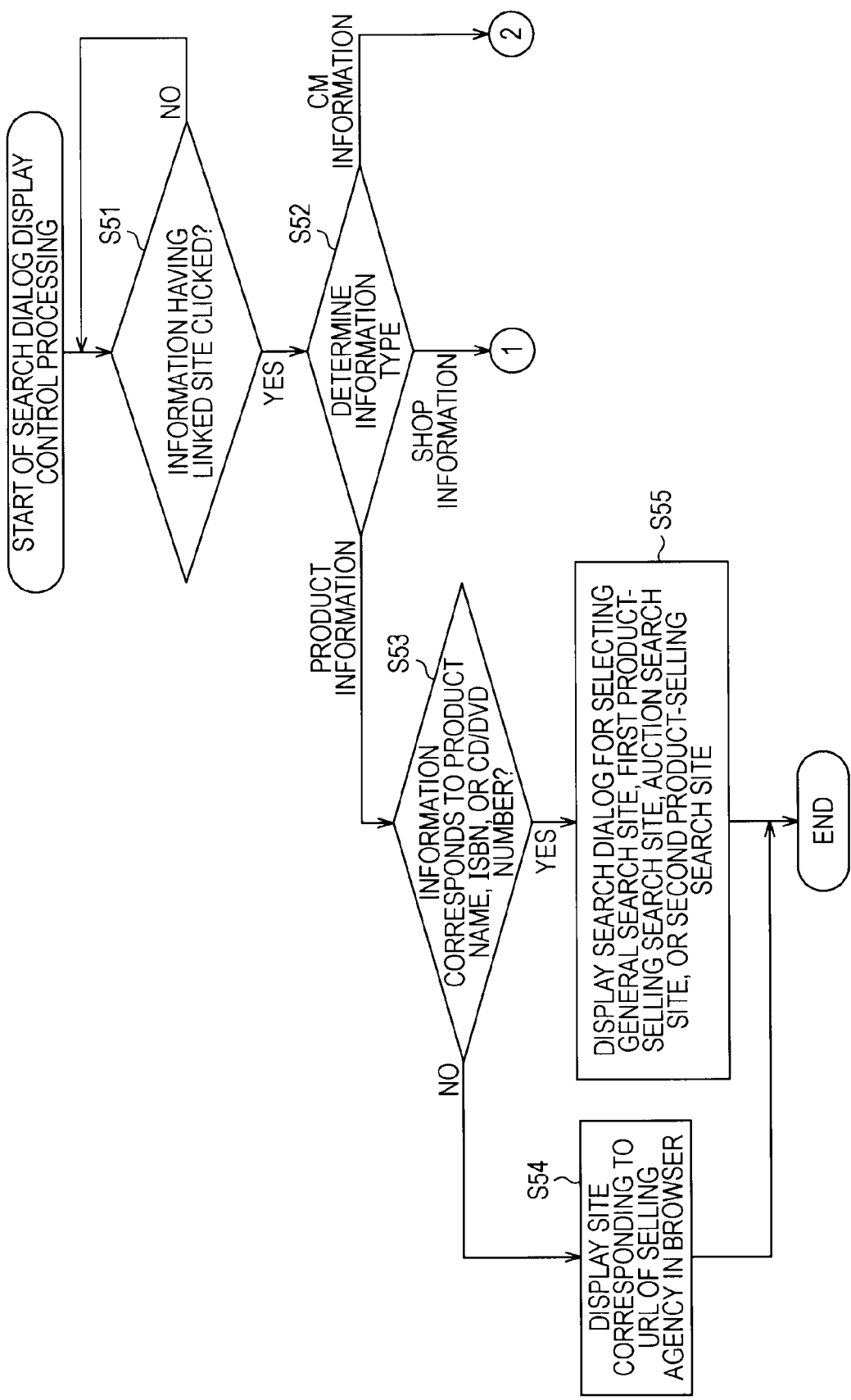
FIG. 8 is a flowchart illustrating search dialog display control processing.

A information processing method includes displaying recommendation information which relates to a recorded program, which is obtained in advance, and which is introduced in the program, and displaying, when the recommendation information is searchable by web searching, a notification describing that the recommendation information is searchable by the web searching along with the recommendation information in a reproduction instruction screen, and determining at least one search site in accordance with a type of the recommendation information when a user selects the searchable recommendation information and displaying a search dialog including the determined at least one search site as at least one candidate (step S55 of FIG. 8, for example).

An embodiment of the present invention will now be described hereinafter with reference to the accompanying drawings.

Figure 1:
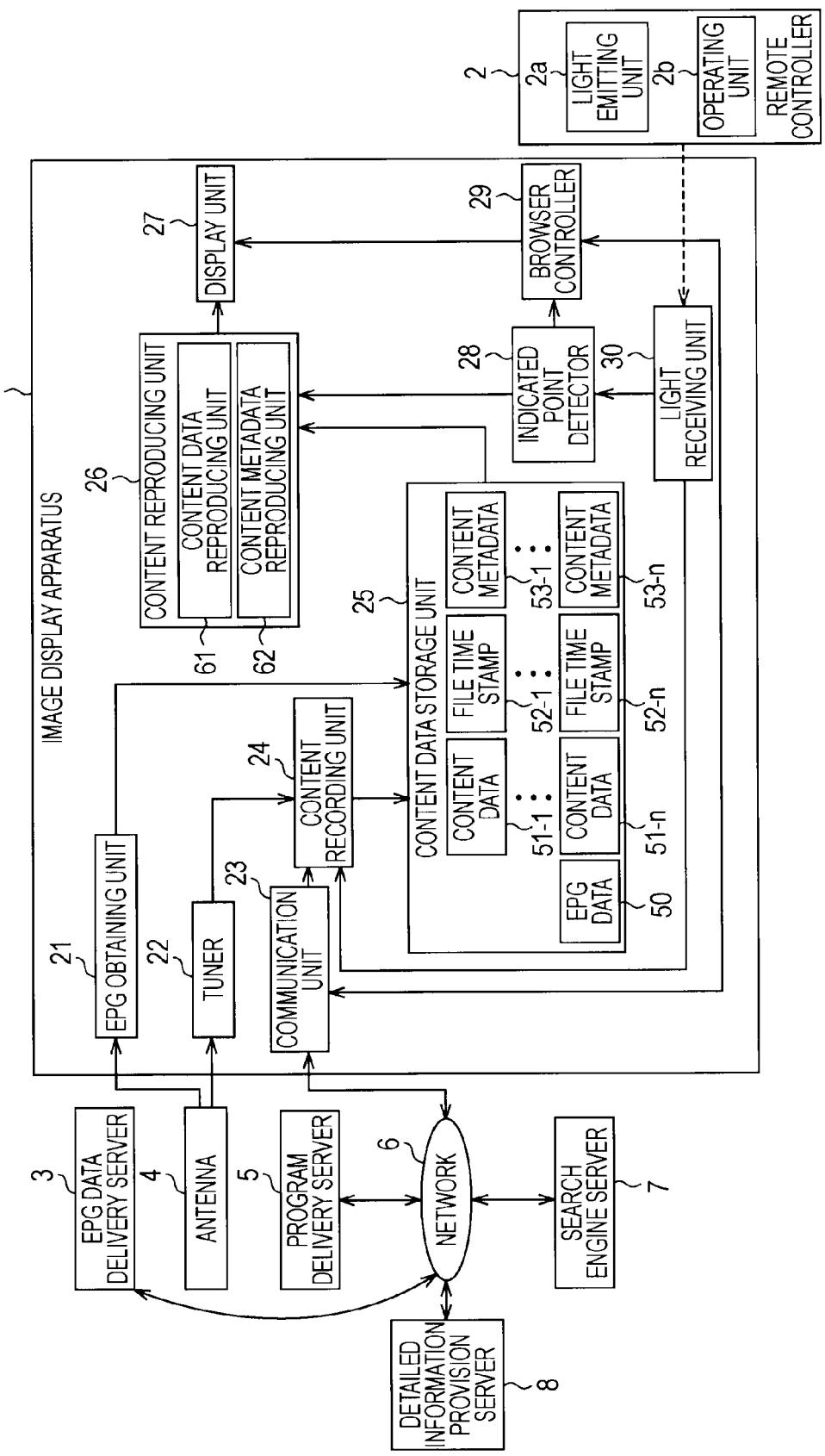
FIG. 1 is a block diagram illustrating a configuration example of an image display apparatus according to an embodiment of the present invention.

FIG. 1 is a diagram illustrating an example of a configuration of an image display apparatus (information processing apparatus) according to an embodiment of the present invention.

An image display apparatus 1 corresponds to a television receiver, for example. The image display apparatus 1 is operated using a remote controller 2 so as to receive content (a program) transmitted as a broadcasting wave from a broadcast station (not shown) to an antenna 4, display the content, and record or reproduce the content. Furthermore, the image display apparatus 1 obtains content transmitted from a program delivery server 5 through a network 6 such as the Internet, displays the content, and records or reproduces the content.

An EPG obtaining unit 21 receives EPG data 50 transmitted as the broadcasting wave from the broadcast station (not shown) using the antenna 4, and controls a content data storage unit 25 such as a HDD (hard disk drive) to store the EPG data 50 therein. Furthermore, the EPG obtaining unit 21 controls a communication unit 23 such as a modem so as to access an EPG data delivery server 3 through the network 6 and obtain EPG data 50, and controls the content data storage unit 25 to store the EPG data 50 therein.

A content recording unit 24 which is controlled using the remote controller 2 adjusts a tuner 22 to a predetermined channel, and receives content transmitted as broadcasting wave from the broadcast station (not shown) through the antenna 4. The received content is stored as content data 51 in the content data storage unit 25. Furthermore, the content recording unit 24 controls the communication unit 23 to store content as content data 51 transmitted from the program delivery server 5 through the network 6 in the content data storage unit 25. Note that when the content data 51 is stored in the content data storage unit 25, the content recording unit 24 controls the content data storage unit 25 to collectively store therein a recording date and time, a broadcast time, and a channel of the content data 51 as a file time stamp 52. The content data 51 is stored as a single file.

Furthermore, the content recording unit 24 controls the communication unit 23 to obtain detailed information on the content data 51 stored in the content data storage unit 25 from a detailed information provision server 8 through the network 6, and controls the content data storage unit 25 to store therein the detailed information as content metadata 53.

Accordingly, the content data storage unit 25 stores therein the EPG data 50 which is transmitted from the EPG obtaining unit 21, and pieces of content data 51, file time stamps 52, and pieces of content metadata 53 which are transmitted form the content recording unit 24. Pieces of content data 51-1 to 51-$n$ represent different programs, file time stamps 52-1 to 52-$n$ correspond to the pieces of content data 51-1 to 51-$n$, respectively, and pieces of content metadata 53-1 to 53-$n$ correspond to the pieces of content data 51-1 to 51-$n$, respectively.

Note that the EPG data 50 includes information such as a title of a program to be broadcasted or delivered, a recording date and time, a broadcast time, a channel (which corresponds to a broadcast station when a broadcast wave is used for broadcasting or a delivery source company when an Internet delivery is used for data delivery), a genre, and a performer. Each of the pieces of content metadata 53 includes information such as a program title recorded using the content recording unit 24, a recording date and time, a broadcast time, a channel, a genre, and a performer, and information (detailed information) on a section of a program and a CM (commercial message).

When a user instructs using the remote controller 2 through an instruction point detector 28 a content data reproducing unit 61 included in a content reproducing unit 26 to reproduce a certain one of the pieces of content data 51 (hereinafter referred to as a "content data 51 of interest"), the content data reproducing unit 61 reads and reproduces the content data 51 of interest from the content data storage unit 25, and displays the content data 51 of interest in a display unit 27 such as a CRT (cathode ray tube) display apparatus or an LCD (liquid crystal display) apparatus.

A content metadata reproducing unit 62 reads the content metadata 53 from the content data storage unit 25 and controls the display unit 27 to display detailed information on recorded content corresponding to the content data 51 of interest stored in the content data storage unit 25. For example, the content metadata reproducing unit 62 controls the display unit 27 to display a recorded content list screen including a list of pieces of recorded content stored in the content data storage unit 25.

The indicated point detector 28 detects a position in a screen instructed by a user in accordance with an operation signal supplied from a light-receiving unit 30, and supplies a signal corresponding to the detection to the content data reproducing unit 61, the content metadata reproducing unit 62, and a browser controller 29.

When the browser controller 29 obtains through the indicated point detector 28 a signal which indicates a fact that detailed information in which an item which is linked to a browser is clicked among pieces of detailed information corresponding to items displayed using the content metadata reproducing unit 62, the browser controller 29 controls the display unit 27 to display a search dialog of the browser. That is, the item which is linked to the browser is an item which may be subjected to web searching. When start of the web searching is instructed using the displayed search dialog, the browser controller 29 controls the communication unit 23 to access a search engine server 7 through the network 6 so that the web searching is performed using a keyword, and controls the display unit 27 to display a result of the web searching. Furthermore, the browser controller 29 controls the communication unit 23 as needed to access a server (not shown) or a predetermined product-selling website which is specified using a URL through the network 6, and controls the display unit 27 to display the URL.

When an operation unit 2b of the remote controller 2 is operated and an infrared signal is transmitted from a light-emitting unit 2a, the light-receiving unit 30 receives the infrared signal, converts the infrared signal into an operation signal, and supplies the operation signal to the indicated point detector 28.

Figure 2:
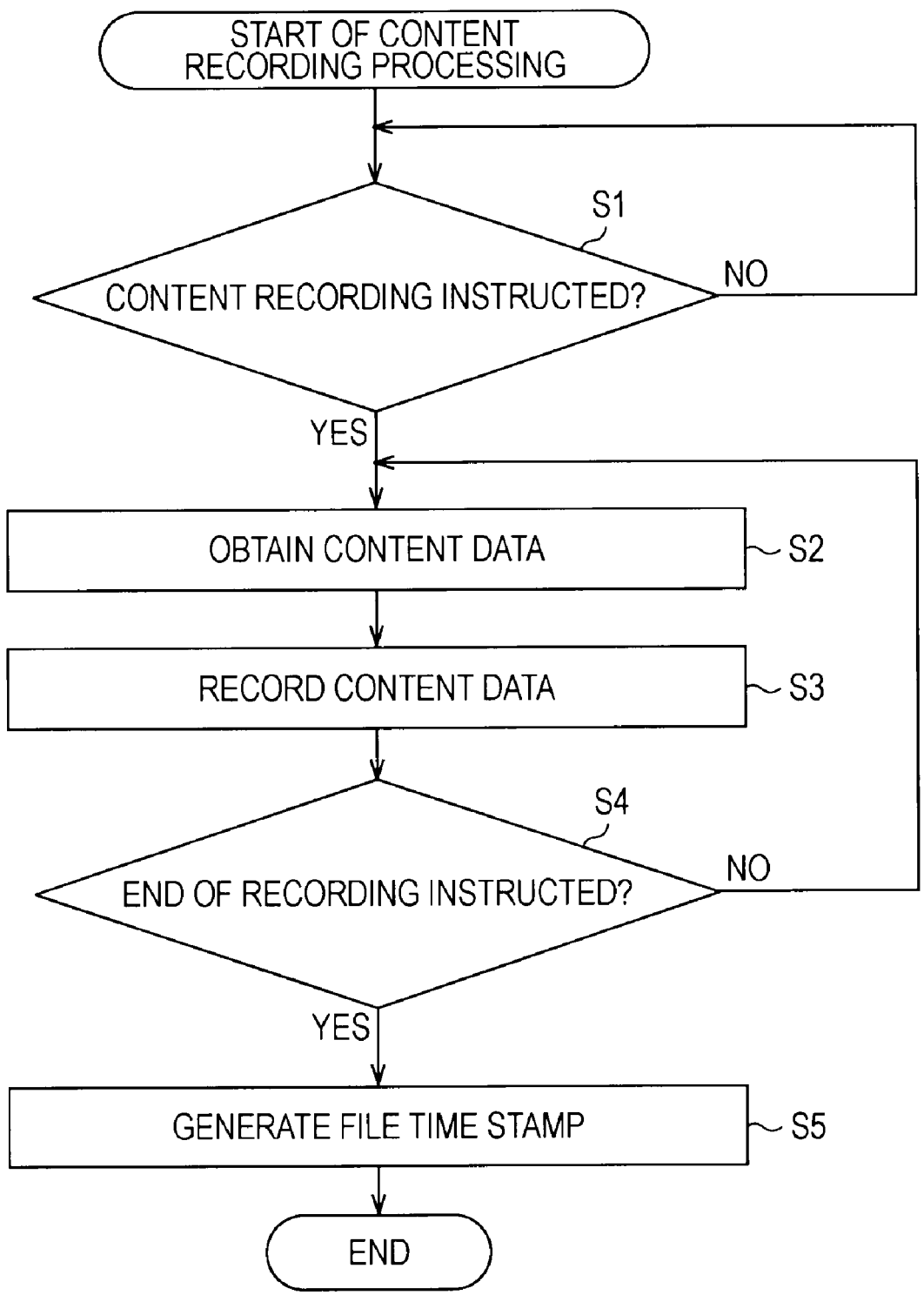
FIG. 2 is a flowchart illustrating content recording processing.

Referring now to a flowchart shown in FIG. 2, content recording processing performed using the content recording unit 24 will be described.

In step S1, the content recording unit 24 determines whether an operation signal supplied from the light-receiving unit 30 corresponds to an instruction of recording. This operation is repeatedly performed until the instruction of recording is detected. Specifically, in step S1, when a user operates the operation unit 2b for instructing content recording, for example, the light-emitting unit 2a transmits an infrared signal in response to the operation of the operation unit 2b. Then, the light-receiving unit 30 receives the infrared signal transmitted from the light-emitting unit 2a of the remote controller 2, and supplies an operation signal which corresponds to the infrared signal and which instructs start of recording to the content recording unit 24. In response to the operation signal, the content recording unit 24 determines that the start of recording is instructed, and the process proceeds to step S2.

In step S2, the content recording unit 24 obtains content data 51 corresponding to content to be recorded. Specifically, the content recording unit 24 controls the tuner 22 so as to set a channel, and obtains content data 51 which is received using the antenna 4 in the predetermined channel. Note that recordable content is not limited to one delivered using a broadcasting wave. When recording of content delivered from the program delivery server 5 via the Internet is instructed, the content recording unit 24 controls the communication unit 23 to access through the network 6 to the program delivery server 5 so as to obtain content data 51.

In step S3, the content recording unit 24 supplies the obtained content data 51 to the content data storage unit 25 for storage.

In step S4, the content recording unit 24 determines whether end of the recording is instructed. When the determination is negative in step S4, the process returns to step S2, and the recording of the content data 51 is continued. On the other hand, when the determination is affirmative in step S4, the process proceeds to step S5 where the content recording unit 24 generates a file time stamp 52 for the content which has just been recorded, and controls the content data storage unit 25 to store the file time stamp 52. The content recording processing is thus terminated.

Note that when the content recording unit 24 has been recording the content data 51 delivered via the Internet, it is determined whether end of recording is instructed or whether the delivery of the content corresponding to the content data 51 is terminated in step S4. When it is determined that the end of recording is not instructed or the delivery of the content data 51 is continued, the process returns to step S2. On the other hand, when it is determined that the end of recording is instructed or the delivery of the content data 51 is terminated in step S4, the process proceeds to step S5 where the content recording unit 24 generates a file time stamp 52 for the content which has just been recorded, and controls the content data storage unit 25 to store the file time stamp 52. The content recording processing is thus terminated.

Figure 3:
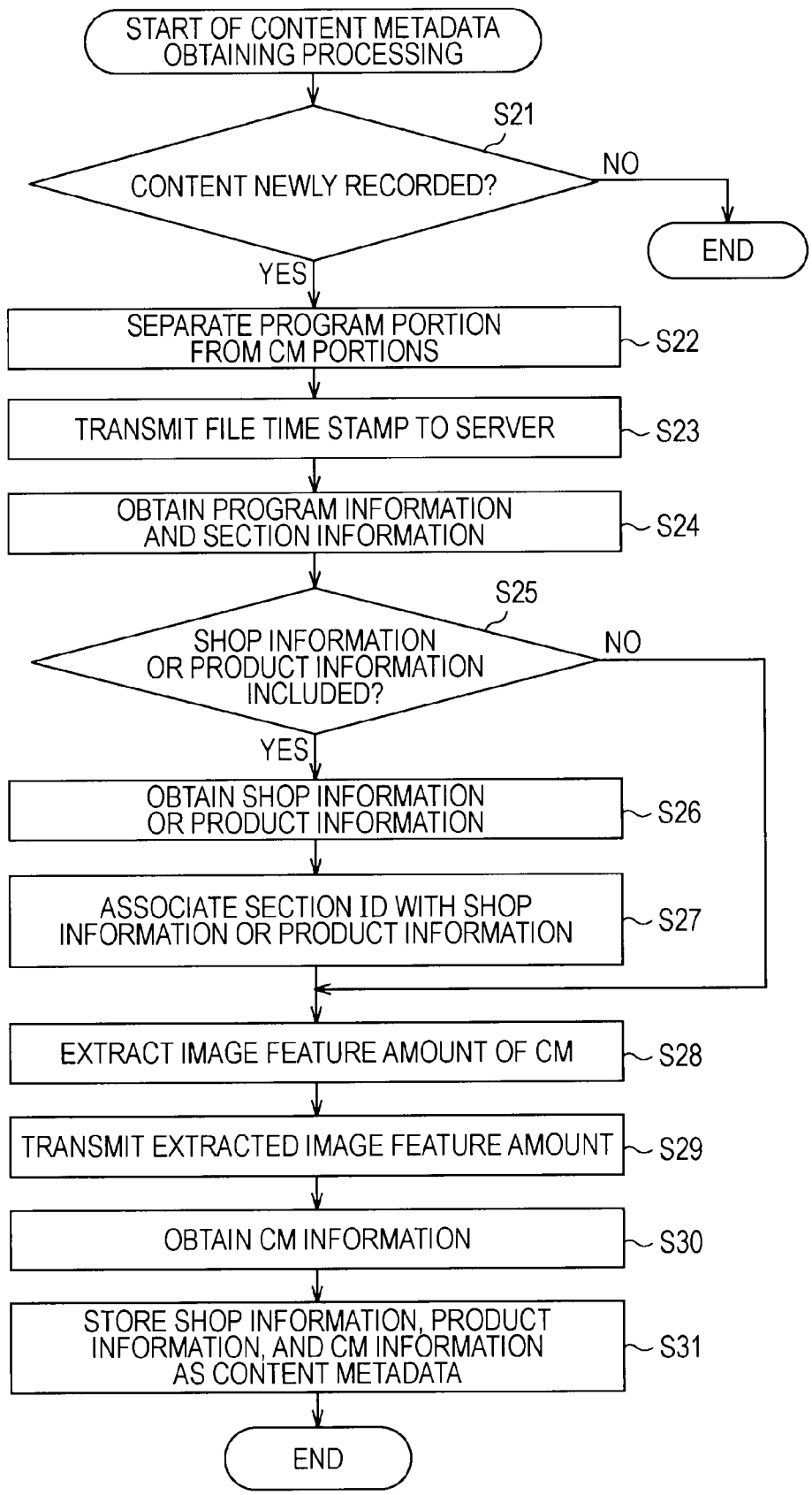
FIG. 3 is a flowchart illustrating content metadata obtaining processing.

Referring now to FIG. 3, content metadata obtaining processing performed for obtaining content metadata 53 corresponding to recorded content data 51 will be described. This process is operated with predetermined time intervals, for example, once a day.

In step S21, the content recording unit 24 determines whether newly recorded content is presence in the content data storage unit 25. When the determination is negative in step S21, the content metadata obtaining processing is terminated.

On the other hand, when the determination is affirmative in step S21, that is, when the content data 51 corresponding to new content which was recorded after preceding content metadata obtaining processing is performed and which is not associated with content metadata 53 thereof has been stored in the content data storage unit 25, the process proceeds to step S22 where the content recording unit 24 analyzes the content data 51 which is not associated with the content metadata 53 thereof (hereinafter referred to as the "content data 51 of interest") so as to separate CM portions from program portion of the content data 51 of interest. The program portion and the CM portions of the content data 51 of interest are distinguished by detecting the CM portions of the content data 51 of interest, for example.

In step S23, the content recording unit 24 controls the communication unit 23 to transmit the file time stamp 52 corresponding to the content data 51 of interest through the network 6 to the detailed information provision server 8.

In step S24, the content recording unit 24 receives or obtains program information which is information on a program corresponding to the content data 51 of interest and pieces of section information which are pieces of information on sections included in the program which are transmitted from the detailed information provision server 8 through the communication unit 23 in accordance with the file time stamp 52. The pieces of section information are obtained by dividing the program into sections and by associating pieces of information on the sections such as section start times, section end times, and titles of the corresponding sections with section IDs. The program information and the pieces of section information will be described hereinafter with reference to FIG. 4. Note that description will be made taking one of the pieces of section information as an example for simplicity hereinafter.

In step S25, the content recording unit 24 determines whether the section information includes shop information or product information which is information (introduction information) on a shop or a production introduced in one of the sections of the program corresponding to the section information. The section information includes a flag indicating presence or absence of the shop information or the product information. The content recording unit 24 refers the flag and determines whether the shop information or the product information is included in the section information.

When the determination is negative in step S25, the process proceeds to step S28. On the other hand, when the determination is affirmative in step S25, the process proceeds to step S26 where the content recording unit 24 controls the communication unit 23 to access the detailed information provision server 8 through the network 6 so as to obtain the shop information or the product information. Although the shop information and the product information will be described in detail hereinafter with reference to FIG. 5, the shop information and the product information at least include information on a time point when the shop is introduced and information on a time point when the product is introduced, respectively.

In step S27, the content recording unit 24 compares the information on the time point when the shop is introduced included in the shop information or the information on the time point when the product is introduced included in the product information with periods of times of sections of the program so as to specify one of the sections in which the shop or the product is introduced, and associates a section ID of the specified section with the shop information or the product information.

The content recording unit 24 extracts an amount of image feature of each of the CM portions in step S28, and controls the communication unit 23 to transmit the extracted amount of image feature to the detailed information provision server 8 in step S29. Note that description will be made taking one of the CM portions as an example for simplicity hereinafter.

In step S30, the content recording unit 24 controls the communication unit 23 to receive or obtain detailed information on a CM corresponding to the CM portion transmitted from the detailed information provision server 8 in accordance with the amount of image feature. The detailed information on a CM will be described with reference to FIG. 4 hereinafter. Note that the detailed information on the CM includes a product name, a title, a company name, and a company URL.

In step S31, the content recording unit 24 controls the content data storage unit 25 to collectively store therein the program information, the section information, the shop information, the product information, and the detailed information on the CM which are obtained in foregoing steps as content metadata 53. The content metadata obtaining processing is thus terminated.

As described above, in the content metadata obtaining processing, the information on the program portion of the content recorded in accordance with an instruction issued by the user is obtained on the basis of the file time stamp 52, and the information on the CM portion is obtained on the basis of the amount of image feature of the CM. The information on the program portion and the information on the CM portion are collectively stored as content metadata 53 in the content data storage unit 25.

The program portion and the CM portion may be obtained using one of the file time stamp 52 and the amount of image feature. Furthermore, the program information, the section information and the detailed information on the CM may be simultaneously obtained.

Note that the section information and the detailed information on the CM of the program may be provided by different detailed information provision servers 8. For example, in a case where a metadata provision company which provides the section information of the program is different from a metadata provision company which provides the detailed information on the CM, two detailed information provision servers 8 are employed, that is, a detailed information provision server 8 for obtaining the section information of the program and a detailed information provision server 8 for obtaining the information on the CM.

FIGS. 4 and 5 show an example of the content metadata 53 stored in the content data storage unit 25 through the content metadata obtaining processing.

FIG. 4 shows examples of the program information and the section information obtained in step S24 of FIG. 3 and an example of the detailed information on the CM (hereinafter referred to as "CM information") obtained in step S30.

FIG. 5 shows an example of the shop information and the product information which are included in the content metadata 53 and which are obtained in step S26 of FIG. 3.

The program information includes items, as shown in FIG. 4, such as "program ID" which is an identifier uniquely assigned to the program by the metadata provision company, "program start time" corresponding to a start time of the program, "program end time" corresponding to an end time of the program, "broadcast station name" corresponding to a name of a broadcast station which broadcasts the program, "genre" corresponding to information on a genre assigned to the program by the metadata provision company, "program name" corresponding to a program name which appears on an image, "last update date and time" corresponding to a date and time when the program information is updated by the metadata provision company, "presence or absence of shop information or product information" which is a flag representing whether the shop information or the product information for the program exists, and "metadata status flag" which is a flag representing a metadata generation status of the program and the section information.

The section information includes items, as shown in FIG. 4, such as "section ID" which is an identifier uniquely assigned to the section by the metadata provision company, "section start time" representing a start time of the section which is measured from the program start time, "section end time" corresponding to an end time of the section which is measured from the program start time, "genre" which is information on a genre assigned to the section by the metadata provision company, "headline" representing a title of the section, "memo" corresponding to a memo regarding the section, "last update date and time" representing a date and time when the section information is updated, "shop information" corresponding to simple information on a shop which is introduced in the section, and "product information" corresponding to simple information on a product introduced in the section.

The CM information includes items, as shown in FIG. 4, such as "CM ID" which is an identifier uniquely assigned to the CM by the metadata provision company, "CM start time" representing a start time of the CM which is measured from the program start time, "CM end time" representing an end time of the CM which is measured from the program start time, "product name" representing a name of the product, "product URL" representing a URL of a site where the product is introduced, "title" representing a title of the CM, "company name" corresponding to a name of a distributor, "company URL" representing a URL of the distributor, "broadcasting start time" representing a date and time when broadcasting of the CM is started, "advertising copy" representing an advertising copy of the product, "genre" representing a genre of the product, "subgenre" representing a subgenre of the product, "song" representing a name of a song used in the CM, "artist" representing a name of an artist of the song used in the CM, "CD title" representing a title of the CD including the song used in the CM, "CD number" representing a number of the CD including the song used in the CM, "CD release date" representing a release date of the CD including the song used in the CM, and "performer" representing a name of a performer in the CM.

Note that items corresponding to marks "Yes" in columns of "detailed information" of the CM information are to be displayed on a shop/product display portion 127 which will be described hereinafter with reference to FIG. 6, and among the items corresponding to the marks "Yes", items corresponding to marks "Link" in columns of "link" of the CM information are linked to a browser.

The shop information includes items, as shown in FIG. 5, such as "shop ID" which is an identifier uniquely assigned to the shop by the metadata provision server, "shop information start time" representing a start time of the section which includes introduction of the shop, "shop information end time" representing an end time of the section which includes introduction of the shop, "shop name" representing a name of the shop, "pronunciation" representing a pronunciation of the shop, "genre 1" representing that the shop information corresponds to the shop, "genre 2" representing a genre of the shop, "genre 3" representing a subgenre of the shop, "genre 4" representing another subgenre of the shop, "area" representing an area where the shop is located, "postal code" representing a postal code of the shop, "address" representing an address of the shop, "phone number" representing a phone number of the shop, "fax number of shop" representing a fax number of the shop, "shop URL" representing a URL of the shop, "location information (latitude)" representing a location of the shop and representing latitude information based on the geographic coordinate system, "location information (longitude)" representing the location of the shop and representing longitude information based on the geographic coordinate system, "opening hour" representing opening hour of the shop, "regular holiday" representing regular holidays of the shop, "introduced menu/price 1" representing information on one of items introduced in the program, "introduced menu/price 2" representing information on one of the rest of the items introduced in the program, "introduced menu/price 3" representing information on one of the rest of the items introduced in the program, "introduced menu/price 4" representing information on one of the rest of the items introduced in the program, "introduced menu/price 5" representing information on one of the rest of the items introduced in the program, "memo" representing a memo regarding the shop, "outline" representing an outline of the shop, "parking" representing presence or absence of parking of the shop, "parking capacity" representing capacity of the parking, "seating capacity" representing the number of seats, "reservation" representing whether reservation is available, "nonsmoking seat" representing whether nonsmoking seats are available, "credit card payment" representing availability of a credit card, "card information" representing an available credit card company, "reference program ID" representing a program ID of a program which refers to the shop information, and "last update date and time" representing a date and time when the shop information is updated by the metadata provision company.

The product information includes items, as shown in FIG. 5, "product ID" which is an identifier uniquely assigned to the product by the metadata provision company, "product information start time" representing a start time of the section including introduction of the product, "product information end time" representing an end time of the section including introduction of the product, "shop name" representing a shop name selling the product, "phone number" representing a phone number of the shop, "fax number of shop" representing a fax number of the shop, "distributor URL" representing a URL of a distributor, "memo (product detail)" representing a memo regarding the product, "outline" representing an outline of the product, "product name" representing a name of the product, "price" representing a price of the product, "ISBN" representing a number used to identify a book, "CD/DVD number" representing a CD number or a DVD number, "genre 1" representing that the product information corresponds to the product, "genre 2" representing a genre of the product, "genre 3" representing a subgenre of the product, "genre 4" representing another subgenre of the product, "reference program ID" representing a program ID of a program which refers to the product information, and "last update date and time" representing a date and time when the product information is updated by the metadata provision company.

Note that, also in FIG. 5, items corresponding to marks "Yes" in columns of "detailed information" of the shop information and the product information are to be displayed on the shop/product display portion 127 which will be described hereinafter with reference to FIG. 6, and among the items corresponding to the marks "Yes", items corresponding to marks "Link" in columns of "link" of the shop information and the product information are linked to a browser.

Note that in a case where any information regarding one of the items does not obtained, display of the item is omitted. Specifically, in a case where the distributor URL is not obtained, for example, the display of the distributor URL is omitted. Furthermore, the all items described above are not necessarily included in the program information, the section information, the CM information, the shop information, and the product information.

An example of a screen displayed in the display unit 27 using the content metadata 53 stored in the content data storage unit 25 under the control of the content metadata reproducing unit 62 will now be described.

For example, when the user selects one of a plurality of pieces of content stored in the content data storage unit 25 for reproduction, the user may check a program corresponding to the content before the reproduction so as to determine whether the user wishes to reproduce the content. When the user selects certain content from among the plurality of pieces of content which are stored in the content data storage unit 25 and which are displayed in a recorded content list screen (not shown), and operates a program detailed information button (not shown) used to display detailed information on the program corresponding to the selected content, a detail display screen 101 is displayed as shown in FIG. 6 using the content metadata reproducing unit 62.

The detail display screen 101 displays a program divided into a plurality of sections and CMs, and serves as a reproduction instruction screen used to issue an instruction of reproduction starting from a desired position of the program. The detail display screen 101 includes a recording/reproducing instruction screen 111, an item category screen 112, and a program detail display screen 113. Pieces of information displayed in the recording/reproducing instruction screen 111 and the item category screen 112 are common to the detail display screen 101 and the recorded content list screen. When the program detail information button is operated, a screen including a list of pieces of recording content is replaced by the program detail display screen 113 which displays detailed information of the program. The program detail display screen 113 shown in FIG. 6 is an example of a screen shown when a program "XXXX" ("XXXX" is a name of the program) is selected from the recorded content list screen.

The recording/reproducing instruction screen 111 includes a reproduction button used to instruct reproduction of a certain program, a writing button used to instruct writing using the content data 51 from the content data storage unit 25 to a recording medium, a delete button used to instruct deletion of a certain program, an entrusted recording button used to set a keyword, for example, used for auto recording, and a programmed recording button used for programmed recording of a certain program.

The item category screen 112 shows a list of items to be selected when, among a number of pieces of content stored in the content data storage unit 25, content which corresponds to a predetermined item is displayed.

Referring to FIG. 7, the items displayed in the item category screen 112 will be described.

The items displayed in the item category screen 112 are categorized into first-stage categories "program", "CM", "shop information", and "product information".

The first-stage category "program" includes second-stage categories "channel", "genre", and "automatically-converted program". The second-stage category "channel" includes names of broadcasting stations (channels) "MHK 1", "great-Japan TV", and "Fujiyama TV", for example, included in a recorded program. The second-stage category "genre" includes genres "sports", "drama", and "variety shows", for example, included in the recorded program.

The first-stage category "CM" includes second-stage categories "genre", "company name", and "performer". The second-stage category "genre" includes genres "drink", "home appliance", and "car", for example, included in the CMs in the recorded program. The second-stage category "company name" includes company names "A", "B", and "C", for example, included in the CMs in the recorded program. Furthermore, the second-stage category "performer" includes names of performers "A", "B", and "C", for example, included in the CMs in the recorded program.

The first-stage category "shop information" is divided into second-stage categories "location" and "genre". The second-stage category "location" includes names of prefectures "Miyagi", "Tokyo", and "Kyoto", for example, included in the shop information included in the recorded program. The second-stage category "genre" includes genres "amusement", "department store/shop", "fashion", "leisure", "restaurant", "accommodation", "life/home decoration", "beauty/health", and "others", for example, included in the shop information included in the recorded program.

The first-stage category "product information" includes second-stage categories "DVD/video", "toy/hobby", "fashion", "food/drink", "pet/pet goods", "leisure/outdoor goods", and "music/CD", for example, included in the product information included in the recorded program.

Referring back to FIG. 6, a "back-to-list" button 121 which is operated in order to change the program detail display screen 113 to the recorded content list screen, a character string "XXXX" indicating that this program detail display screen 113 is provided for the program "XXXX", and a character string "1.5 H" representing a period of time the program "XXXX" is recorded (one hour and half) are displayed on the uppermost portion of the program detail display screen 113. In addition, a recording date and time and a channel of the program "XXXX" are also displayed.

Below the program name in the program detail display screen 113, a "catalog view" button 122 used to display a catalog view screen which shows content for each section of the program, a "detailed information" button 123 used to display a program information screen which shows information on the program (the program information shown in FIG. 4), a "file detail" button 124 used to display a file detail screen which shows information on a file including the program "XXXX" such as a bit rate and capacity, and a "recommended movie" button 125 used to display a recommended movie screen which shows a movie recommended in the program "XXXX".

Figure 6:
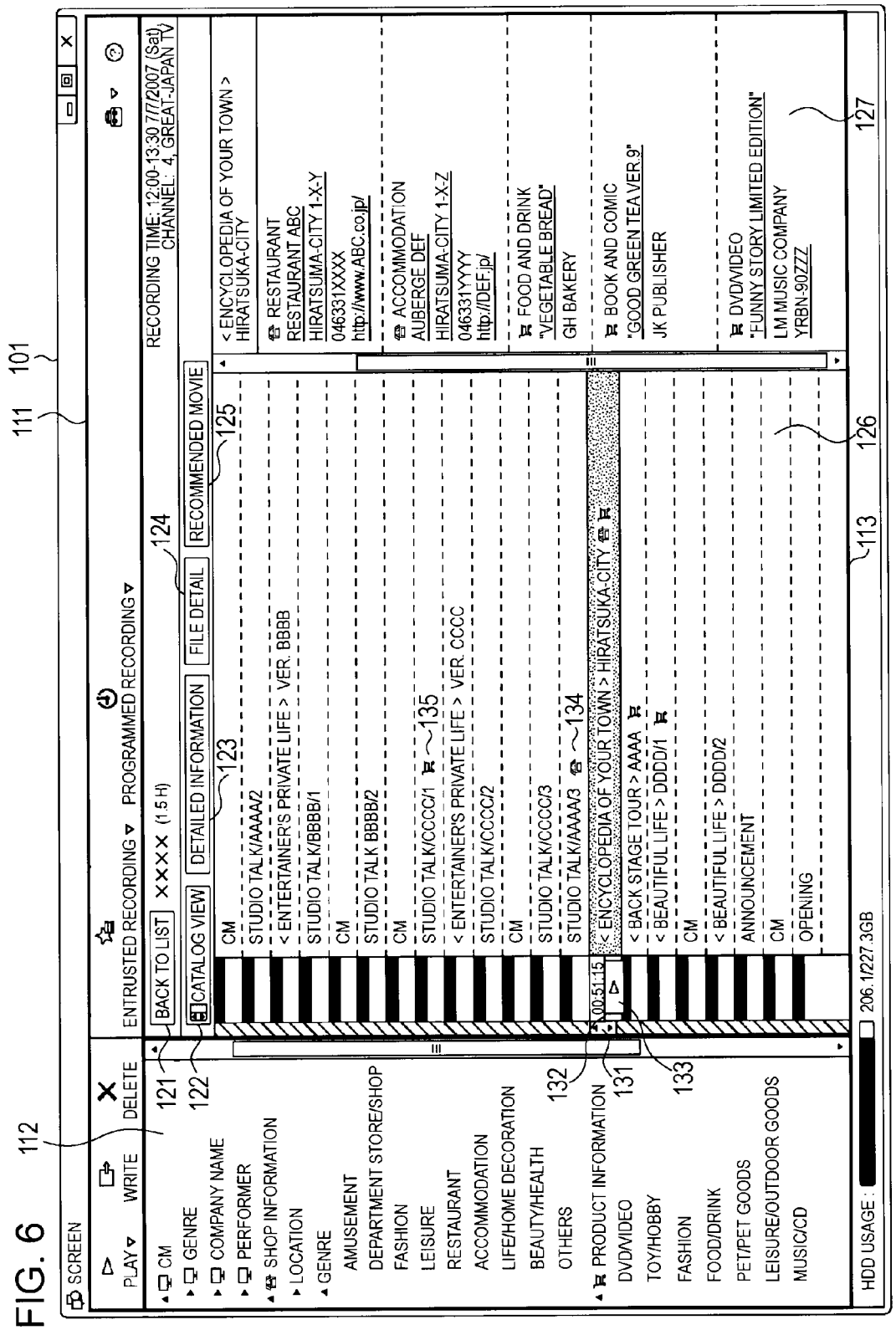
FIG. 6 is a diagram illustrating an example of a detail display screen.

The program detail display screen 113 shown in FIG. 6 is a display example when the "catalog view" button 122 is operated. A section information display region 126 and a shop/product display region 127 are displayed below a region including the "catalog view" button 122, the "detailed information" button 123, the "file detail" button 124, and the "recommended movie" button 125.

In the section information display region 126, the sections and the CMs included in the program are arranged in a time-series manner so as to correspond to the section information and the CM information of the content metadata 53 shown in FIG. 4. In the shop/product display region 127, the shop information and the product information of the content metadata 53 are arranged.

Note that in the section information display region 126 shown in FIG. 6, "AAAA", "BBBB", "CCCC", and "DDDD" correspond to names of performers in the sections.

An operation indicator 131 is arranged in the section information display region 126. The user selects a desired one of the sections and the CMs by locating the operation indicator 131 in a position corresponding to the desired one of the sections and the CMs. Specifically, when the user moves the operation indicator 131 in a direction in which the sections and the CMs are arranged in a time-series manner, an indicator reference line 132 and a reproduction button 133 are also moved along with the operation indicator 131. Furthermore, a selected one of the sections which corresponds to a position of the indicator reference line 132 (which also corresponds to a position of the operation indicator 131 moved along with the indicator reference line 132) is highlighted. The operation of moving the operation indicator 131 will be described hereinafter with reference to FIGS. 14 and 15.

When the shop information or the product information is included in each of the sections of the program, a shop information mark 134 or a product information mark 135 is displayed in the section information display region 126. Furthermore, when one of the sections having the shop information mark 134 or the product information mark 135 is selected using the operation indicator 131, the shop information or the product information of the section is displayed in the shop/product display region 127.

In the shop/product display region 127 shown in FIG. 6, pieces of shop information and pieces of product information corresponding to shops and products introduced in a section "<encyclopedia of your town> Hiratsuka" which is highlighted in the section information display region 126 are displayed. For example, shop information including an item "restaurant" representing a genre of a shop, a name of the shop "restaurant ABC", an address of the shop "Hiratsuka-City 1-X-Y", a phone number of the shop "046331XXXX", and a URL of the shop "http://www.ABC.co.jp", and product information including an item "DVD/video" representing a genre of a product, a name of the product "Funny Story Limited Edition", a company name "LM music company", and an ISBN "YRBN-90ZZZ" are displayed in the shop/product display region 127.

Note that the pieces of shop information and the pieces of product information shown in the shop/product display region 127 correspond to the items in the shop information and the product information which have the "Yes" marks in the columns of the "detailed information" shown in FIG. 5. Furthermore, pieces of information which are underlined in the shop/product display region 127 have linked sites. The pieces of information which have linked sites correspond to the items in the shop information and the product information which have the "Link" marks in the columns of the "link" shown in FIG. 5.

When the user selects (clicks) one of the pieces of information (items) which have linked sites in the shop/product display region 127, the browser controller 29 obtains a signal in response to the selection made by the user through the indicated point detector 28, and controls the display unit 27 to display a search dialog of a browser in accordance with a type of selected information.

Referring now to flowcharts shown in FIGS. 8 to 10, search dialog display control processing performed by the browser controller 29 will be described.

In step S51, the browser controller 29 determines whether one of the pieces of information which have linked sites was clicked in accordance with information transmitted from the indicated point detector 28. This operation is repeatedly performed until it is determined that one of the pieces of information which have linked sites was clicked.

In step S51, when the determination is affirmative, the process proceeds to step S52 where the browser controller 29 determines a type of the clicked information.

In step S52, when it is determined that the type of the clicked information is the product information which was introduced in the section, the process proceeds to step S53. When it is determined that the type of the clicked information is the shop information which was introduced in the section, the process proceeds to step S56 in FIG. 9. When it is determined that the type of the clicked information is the CM information, the process proceeds to step S67 in FIG. 10.

When it is determined that the type of the clicked information is the product information which was introduced in the section in step S52, the browser controller 29 determines whether the clicked information corresponds to one of a product name, an ISBN, and a CD/DVD number in step S53.

When it is determined that the clicked information does not correspond to any one of the product name, the ISBN, and the CD/DVD number in step S53, the process proceeds to step S54. When it is determined that the clicked information does not correspond to any one of the product name, the ISBN, and the CD/DVD number, it is determined that a distributor URL is clicked. Therefore, a site corresponding to the distributor URL is displayed in a browser under the control of the browser controller 29, and the process is terminated.

On the other hand, when it is determined that the clicked information corresponds to one of the product name, the ISBN, and the CD/DVD number in step S53, the process proceeds to step S55. In step S55, a search dialog for selecting a search site from among a general search site used for searching in which a search range is not limited to a specific range, a search site specially used for searching in which the search range is limited to sites of shops which sell products (hereinafter referred to as a "first product-selling search site"), a search site specially used for searching in which the search range is limited to auction sites (hereinafter referred to as an "auction search site"), and a search site specially used for searching in which the search range is limited to sites of shops which sell products (hereinafter referred to as a "second product-selling search site") is displayed under the control of the browser controller 29. The process is thus terminated.

Figure 11:
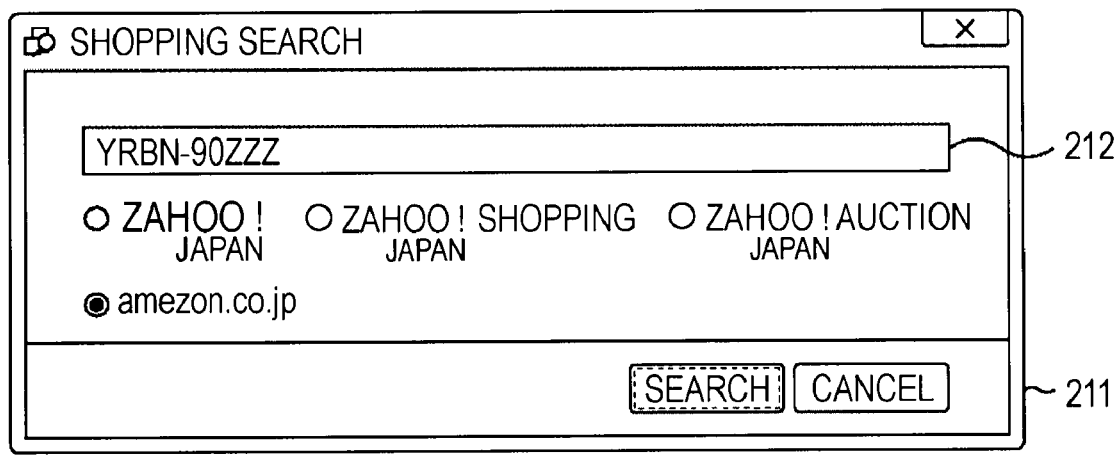
FIG. 11 is a diagram illustrating an example of a search dialog.

FIG. 11 shows an example of the search dialog displayed in step S55. In FIG. 11, a search dialog 211 includes selectable candidates of search sites, that is, a general search site named "Zahoo!", a first product-selling search site named "Zahoo! shopping", an auction search site named "Zahoo! auction", and a second product-selling search site named "amezon.co.jp".

Furthermore, in the search dialog 211, an item corresponding to the clicked information is displayed in advance in a textbox 212 to which a search string is to be input. In FIG. 11, the ISBN is displayed as an example of the item corresponding to the clicked information. Accordingly, the user selects a desired one of the search sites so that search processing is immediately performed using the ISBN.

Figure 9:
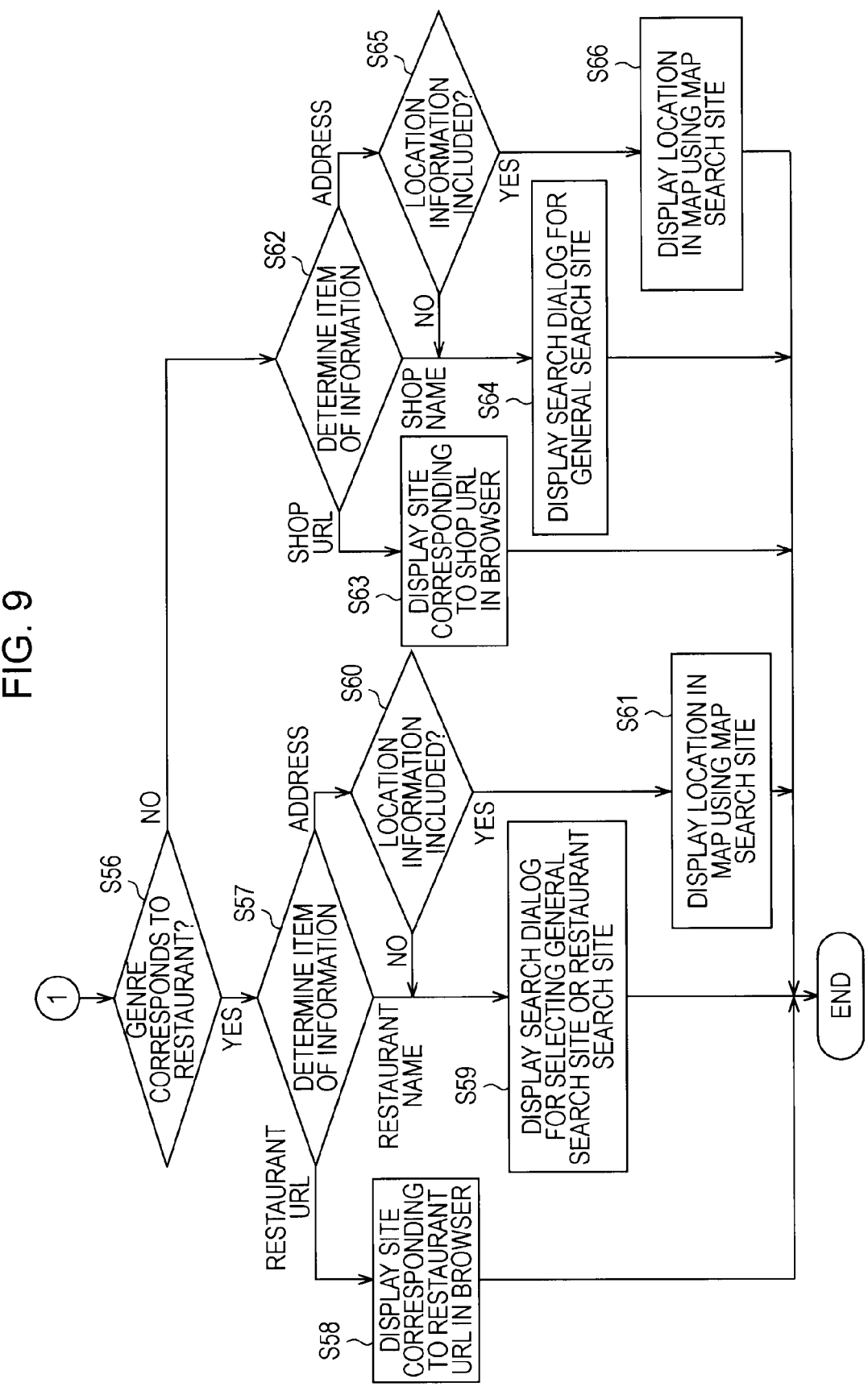
FIG. 9 is a flowchart illustrating the search dialog display control processing.

Referring back to FIG. 8, when it is determined that the type of the clicked information corresponds to information on a shop introduced in the section in step S52, the process proceeds to step S56 shown in FIG. 9. In step S56, it is determined whether a genre of the shop information corresponding to the clicked information is a restaurant.

When the determination is affirmative in step S56, the process proceeds to step S57 where the browser controller 29 determines whether the item of the clicked information corresponds to one of the shop URL, the shop name, and the address of the shop.

When it is determined that the item of the clicked information corresponds to the shop URL in step S57, the process proceeds to step S58. In step S58, a site corresponding to the shop URL is displayed in a browser under the control of the browser controller 29, and the process is terminated.

When it is determined that the item of the clicked information corresponds to the shop name in step S57, the process proceeds to step S59. In the step S59, a search dialog for selecting one of a general search site and a restaurant search site specially used for searching in which a search range is limited to sites of restaurants is displayed under the control of the browser controller 29. The process is thus terminated.

Figure 12:
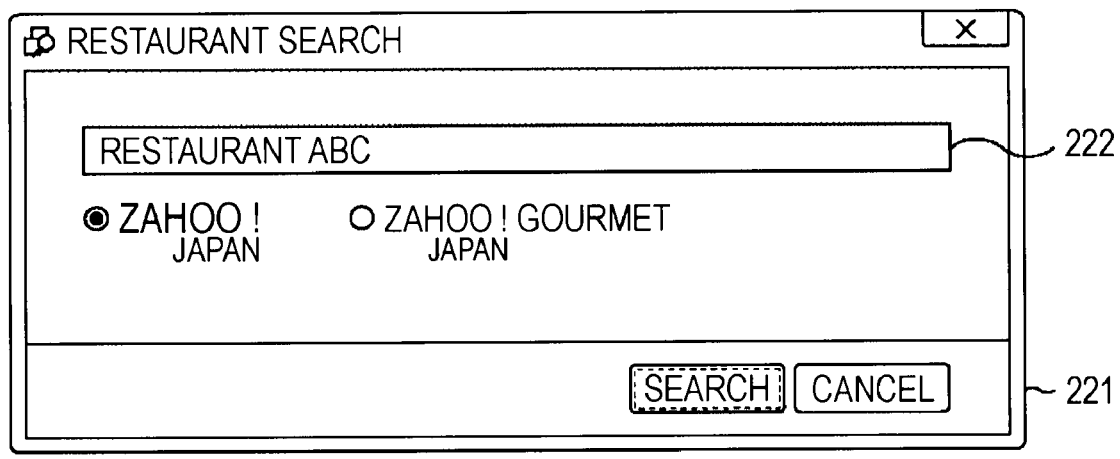
FIG. 12 is a diagram illustrating an example of a search dialog.

FIG. 12 shows an example of the search dialog displayed in step S59. In FIG. 11, a search dialog 221 includes candidates of search sites, that is, a general search site named "Zahoo!", and a restaurant search site named "Zahoo! gourumet" which are selectable using radio buttons. Furthermore, as with the search dialog 211 of FIG. 11, in the search dialog 221, the shop name "restaurant ABC" corresponding to the clicked information is displayed in advance in a textbox 222.

Referring back to FIG. 9, when it is determined that the type of the clicked information corresponds to the address, the process proceeds to step S60. In step S60, the browser controller 29 determines whether the clicked information of the shop information includes location information (latitude and longitude information).

When the determination is negative in step S60, the process proceeds to step S59.

On the other hand, when the determination is affirmative in step S60, the process proceeds to step S61. In step S61, the browser controller 29 controls the browser to display a location corresponding to the location information using a map search site named "Zahoo! Map", for example. The process is thus terminated.

On the other hand, when it is determined that the genre of the clicked information is not a restaurant in step S56, the process proceeds to step S62. In step S62, the browser controller 29 determines whether the item corresponding to the clicked information is one of the shop URL, the shop name, and the address.

When it is determined that the item corresponding to the clicked information corresponds to the shop URL in step S62, the process proceeds to step S63. In step S63, a site corresponding to the shop URL is displayed in the browser under the control of the browser controller 29, and the process is terminated.

Figure 13:
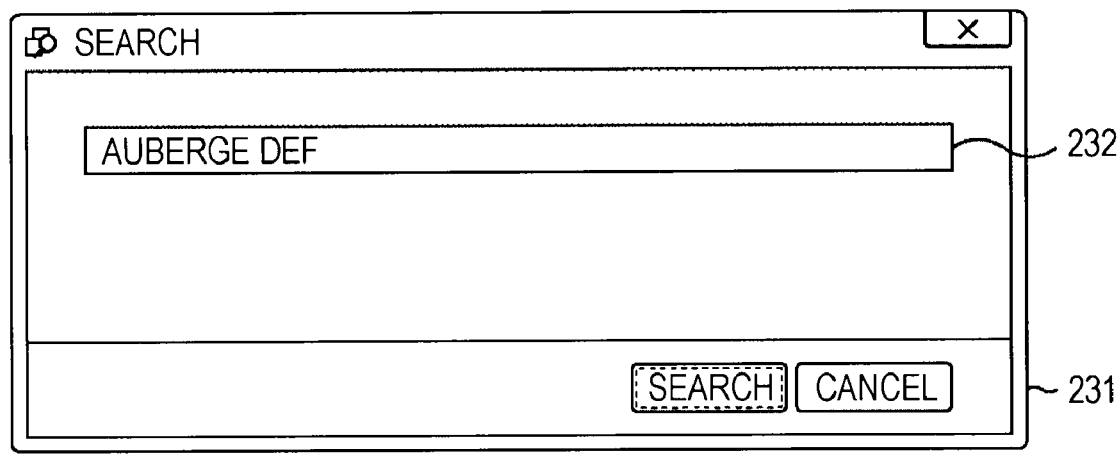
FIG. 13 is a diagram illustrating an example of a search dialog.

When it is determined that the item corresponding to the clicked information corresponds to the shop name in step S62, the process proceeds to step S64. In step S64, a search dialog 231 as shown in FIG. 13 for search processing using a general search site is displayed under the control of the browser controller 29, and thereafter, the process is thus terminated. In the search dialog 231 shown in FIG. 13, the shop name "Auberge DEF" corresponding to a genre of accommodation and corresponding to the clicked information is displayed in advance in a textbox 232.

When it is determined that the item corresponding to the clicked information corresponds to the address in step S62, the process proceeds to step S65. In step S65, the browser controller 29 determines whether the clicked information includes location information (latitude and longitude information).

When the determination is negative in step S65, the process proceeds to step S64 described above.

On the other hand, when the determination is affirmative in step S65, the process proceeds to step S66. In step S66, the browser controller 29 controls the browser to display a location obtained on the basis of the location information using the map search site named "Zahoo! Map", for example. The process is thus terminated.

Figure 10:
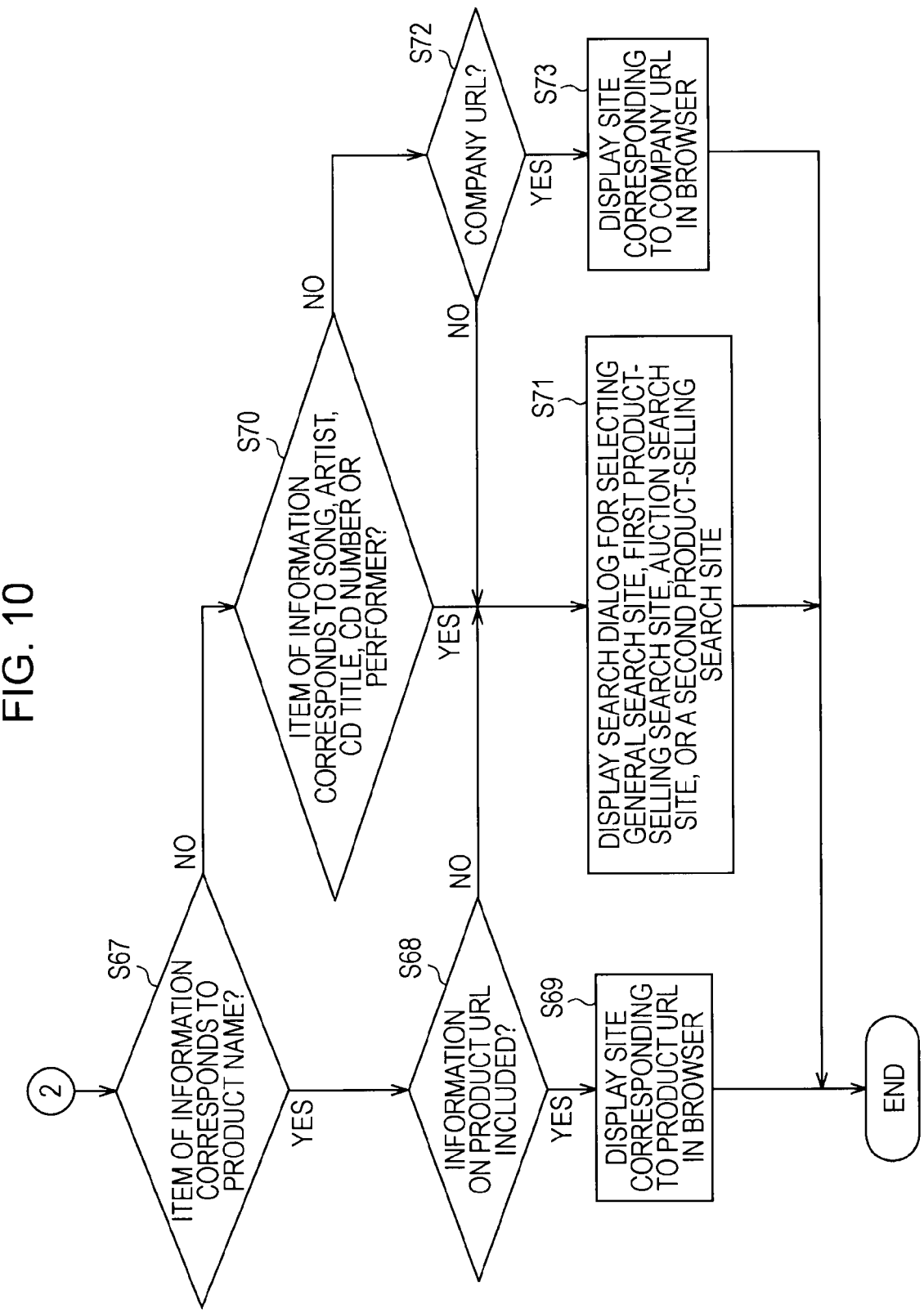
FIG. 10 is a flowchart illustrating the search dialog display control processing.

Referring back to FIG. 8, when it is determined that the type of the clicked information corresponds to the CM information in step S52, the process proceeds to step S67 of FIG. 10. In step S67, the browser controller 29 determines whether the item corresponding to the clicked information is a product name.

When the determination is affirmative in step S67, the process proceeds to step S68. In step S68, the browser controller 29 determines whether the clicked information includes information on a product URL.

When the determination is negative in step S68, the process proceeds to step S71. Processing performed in step S71 will be described hereinafter.

On the other hand, when the determination is affirmative is step S68, the process proceeds to step S69. In step S69, the browser controller 29 controls the browser to display a site corresponding to the product URL, and thereafter, the process is terminated.

When it is determined that the item corresponding to the clicked information is not the product name in step S67, the process proceeds to step S70. In step S70, the browser controller 29 determines whether the item corresponding to the clicked information is one of the song, the artist, the CD title, the CD number, and the performer.

When the determination is affirmative in step S70, the process proceeds to step S71. In step S71, the search dialog 211 used to select a search site from among the general search site, the first product-selling search site, the auction search site, and the second product-selling search site shown in FIG. 11 is displayed under the control of the browser controller 29, and thereafter, the process is terminated.

On the other hand, when the determination is negative in step S70, the process proceeds to step S72. In step S72, the browser controller 29 determines whether the item corresponding to the clicked information is the company URL.

When the determination is negative in step S72, that is, when it is determined that the item corresponding to the clicked information is the company name, the process proceeds to step S71. In step S71, the search dialog 211 (shown in FIG. 11) including the textbox 212 to which the company name is input is displayed under the control of the browser controller 29, and thereafter, the process is terminated.

When the determination is affirmative in step S72, the process proceeds to step S73. In step S73, the browser controller 29 controls the browser to display a site corresponding to the company URL, and thereafter, the process is terminated.

As described above, when the user clicks (selects) one of the items corresponding to the pieces of information having link sites which are displayed in the shop/product display region 127 of the detail display screen 101 shown in FIG. 6, a textbox in a search dialog to which a character string (text) corresponding to one of the pieces of information which is clicked by the user is displayed, or when one of the pieces of information clicked by the user is an address, a map including a location corresponding to the address is displayed using a browser. Accordingly, a quick search operation of searching information which may be usable for the user is enhanced.

Furthermore, when the search dialog is displayed, the user may select a search site from among a plurality of search sites, such as a general search site and a special search site in which a search range is limited to a specific range in accordance with a type (genre) of one of the pieces of information which is clicked by the user. Therefore, the user may use a desired search site selected from among the plurality of search sites. Accordingly, probability in which information which is different from information requested by the user is displayed is lowered. That is, since types of selectable search sites are changed in accordance with the type of the clicked information, search sites capable of searching for appropriate information may be proposed so that desired information is promptly obtained.

Figure 14:
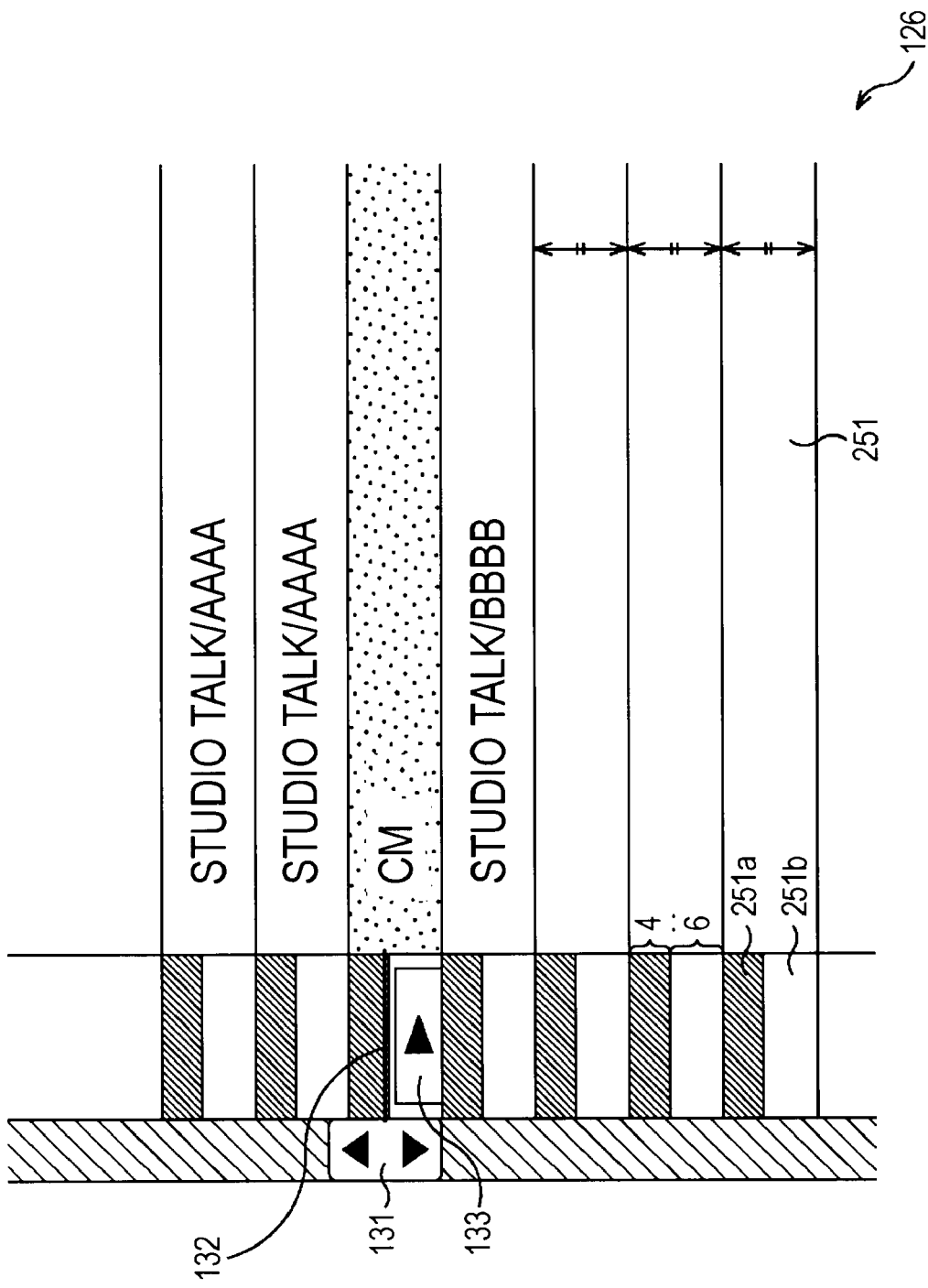
FIG. 14 is a diagram illustrating a user interface of a section information display region.

Referring now to FIG. 14, a user interface of the section information display region 126 will be described.

In the detail display screen 101 shown in FIG. 6 which shows the catalog view displayed when the "catalog view" button 122 is selected, the user checks the sections and the CMs included in the program "XXXX", and instructs start of reproduction of the program from a desired one of the sections (a reproduction position).

FIG. 14 is an enlarged view illustrating the operation indicator 131 and in the vicinity thereof in the section information display region 126. Here, widths of section description regions 251 which include detailed descriptions of the sections and the CMs are equal to one another irrespective of actual periods of times of the sections and the CMs. Therefore, text portions (description portions) are regularly arranged so that the user readily checks the section information display region 126. Furthermore, since irregular widths of section description regions 251 which include the detailed descriptions of the sections and the CMs are avoided, an amount of scrolling in a vertical direction is reduced, and operability is improved.

Portions which are located in leftmost ends of the section description regions 251 and which overlap the indicator reference line 132 are each divided into two portions, i.e., section-leading-position specifying regions 251a and section-arbitrary-position specifying regions 251b, in the proportion of four parts to six (an upper portion to a lower portion). Note that this proportion of each of the section-leading-position specifying regions 251a and a corresponding one of the section-arbitrary-position specifying regions 251b (4:6) is a default value, and may be changed as needed in accordance with setting.

When the user moves the operation indicator 131, the indicator reference line 132 and the reproduction button 133 are also moved in accordance with the movement of the operation indicator 131. When the indicator reference line 132 is located on one of the section-leading-position specifying regions 251a, one of the section description regions 251 which corresponds to the one of the section-leading-position specifying regions 251a is highlighted under the control of the content metadata reproducing unit 62. FIG. 14 shows an example of one of the section description regions 251 of corresponding one of the CMs, which is highlighted.

Furthermore, when the user instructs reproduction of the program "XXXX" by operating the reproduction button 133 and when the indicator reference line 132 is located on one of the section-leading-position specifying regions 251a, the content data reproducing unit 61 starts reproduction from a leading position of one of the sections corresponding to a position of the indicator reference line 132 (hereinafter referred to as a "section of interest" as needed). Therefore, the highlighted section description regions 251 means the section of interest is reproduced from the section leading position.

On the other hand, when the indicator reference line 132 is located on one of the section-arbitrary-position specifying regions 251b, the content data reproducing unit 61 determines a certain position as a reproduction start position in a vertical direction of the section of interest so as to start reproduction. For example, in a case where a reproduction time of the section of interest is 10 minutes and the indicator reference line 132 is located in a position corresponding to eight tenth from an upper end of one of the section description regions 251 of the section of interest, the content data reproducing unit 61 performs reproduction starting from a position corresponding to a time point eight minutes after the reproduction start time of the section of interest. Accordingly, in a first portion corresponding to the section-leading-position specifying region 251a of the section of interest, reproduction is not performed from an arbitrary position, that is, the reproduction is generally performed from the leading position.

Figure 15:
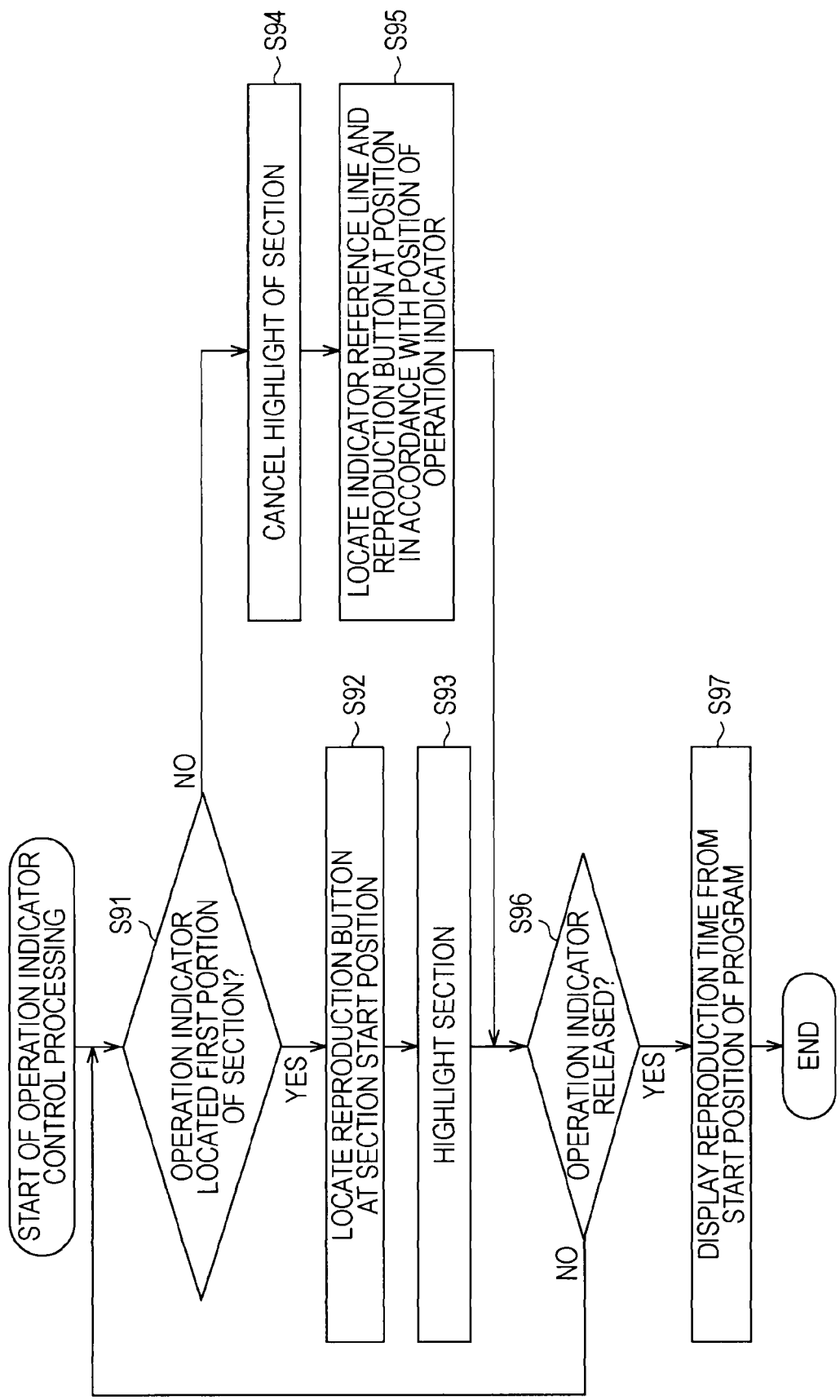
FIG. 15 is a flowchart illustrating operation indicator control processing.

FIG. 15 is a flowchart illustrating operation indicator control processing performed using the content metadata reproducing unit 62. This processing is started when the user start dragging the operation indicator 131.

In step S91, the content metadata reproducing unit 62 determines whether the operation indicator 131 is located in a first portion of the section of interest, that is, whether the operation indicator 131 is located on the section-leading-position specifying region 251a of the section of interest using the indicated point detector 28.

When the determination is affirmative in step S91, the process proceeds to step S92. In step S92, the content metadata reproducing unit 62 controls the operation indicator 131 and the indicator reference line 132 and the reproduction button 133 which are moved in accordance with the operation indicator 131 to be arranged in a leading position of the section of interest. In step S93, the section of interest is highlighted.

On the other hand, when the determination is negative in step S91, that is, when the operation indicator 131 is located on a section-arbitrary-position specifying region 251b of the section of interest, the process proceeds to step S94. In step S94, the content metadata reproducing unit 62 cancels the highlight of the section of interest. In step S95, the content metadata reproducing unit 62 controls the indicator reference line 132 and the reproduction button 133 to be arranged in a position in accordance with a position of the operation indicator 131.

After step S93 and step S95, the content metadata reproducing unit 62 determines whether the user releases the operation indicator 131, that is, whether a dragging operation of the operation indicator 131 is terminated in step S96. When the determination is negative in step S96, the process returns to step S91, and the content data reproducing unit 61 repeatedly performs the processing described above.

On the other hand, when the determination is affirmative in step S96, that is, the dragging operation of the operation indicator 131 is terminated in step S96, the content metadata reproducing unit 62 displays a reproduction time measured from the leading position of a program corresponding to a position of the indicator reference line 132 in an upper portion relative to the indicator reference line 132 (refer to FIG. 6).

As described above, according to the operation indicator control processing, when the indicator reference line 132 is located on the section-leading-position specifying region 251a of the section of interest, reproduction is performed from the leading position of the section of interest. Therefore, the user may readily instruct reproduction to be performed from a leading position of each of the sections. Furthermore, when the indicator reference line 132 is located on the section-leading-position specifying region 251a of the section of interest, the section of interest is highlighted. Accordingly, it is apparent for the user that reproduction is performed in a leading position of one of the sections.

Furthermore, reproduction may be started from an arbitrary position of the section of interest by merely dragging the indicator reference line 132 onto the section-arbitrary-position specifying regions 251b. Even when reproduction is started from a leading position of each of the sections, the similar operation may be employed. Accordingly, a user-friendly operation is attained.

As described above, the user readily instructs reproduction of a recorded program so that the recorded program starts from a desired position of the program using the image display apparatus 1.

Note that in an example described above, when the indicator reference line 132 is located on the section-arbitrary-position specifying regions 251b, a position in which reproduction of a section of interest starts is determined in accordance with a position of the indicator reference line 132 positioned so that the widths of the sections in the vertical direction correspond to entire reproduction times of the sections. In this case, as described above, since the first portions corresponding to the section-leading-position specifying regions 251a are not allowed to be reproduced from arbitrary positions, the widths of the section-arbitrary-position specifying regions 251b may be set so as to correspond to the entire reproduction time of the sections and the section of interest may be reproduced from a reproduction position in accordance with the position of the indicator reference line 132. In this case, the user may instruct reproduction of the section of interest so that the reproduction of the section of interest starts from a desired position in an entire reproduction time.

For example, when a reproduction time of the section of interest is 10 minutes, and the indicator reference line 132 is located in a position corresponding to three tenth from an upper end (a boundary between the section-leading-position specifying region 251a and the section-arbitrary-position specifying region 251b) of the section-arbitrary-position specifying region 251b of the section of interest, the content data reproducing unit 61 performs reproduction starting from a position corresponding to a time point three minutes after a reproduction start time of the section of interest.

The series of processes described above may be executed using hardware or software. When the series of processes are executed using software, a computer including dedicated hardware incorporating a program constituting the software may be used or the software is installed in a general-purpose personal computer capable of executing various functions by installing various programs from a program recording medium.

FIG. 16 is a block diagram illustrating an example of a hardware configuration of a computer which executes the series of processes described above using a program.

In the computer, a CPU (central processing unit) 301, a ROM (read only memory) 302, and a RAM (random access memory) 303 are connected to one another using a bus 304.

The bus 304 is further connected to an input/output interface 305. The input/output interface 305 is connected to an input unit 306 including a keyboard, a mouse, and a microphone, an output unit 307 including a display and a speaker, a storage unit 308 including a hard disk and a nonvolatile memory, a communication unit 309 including a network interface, and a drive 310 which drives a removable medium 311 such as a magnetic disc, an optical disc, a magneto-optical disc, or a semiconductor memory.

In the computer configured as described above, a program stored in the storage unit 308 is loaded through the input/output interface 305 and the bus 304 in the RAM 303 to be executed under the control of the CPU 301 whereby the series of processes described above is performed.

The program executed by the computer (CPU 301) is provided by being stored, for example, in the removable medium 311 such as a package medium including a magnetic disc (including a flexible disc), an optical disc (such as a CD-ROM (compact disc read-only memory) or a DVD (digital versatile disc)), a magneto-optical disc, or a semiconductor memory or by a wired or wireless transmission medium such as a local area network, the Internet, or a digital satellite broadcasting.

The program may be installed in the storage unit 308 through the input/output interface 305 by inserting the removable medium 311 into the drive 310. Furthermore, the program is received using the communication unit 309 through the wired or wireless transmission medium and installed in the storage unit 308. Furthermore, the program may be installed in the ROM 302 or the storage unit 308 in advance.

Note that the program executed by the computer may be processed in a time series manner in an order described herein. Alternatively, the program may be executed in parallel, or executed as needed when the program is called, for example.

Furthermore, the steps included in the flowcharts may be performed in a time series manner along an order described herein, and may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    program information display control means for
        displaying recommendation information which relates to a recorded program, which is obtained in advance, and which is included in the program, and
        displaying, when the recommendation information is searchable by web searching, a notification describing that the recommendation information is searchable by the web searching along with the recommendation information;
    search display control means for determining at least one search site as at least one candidate to perform the web searching of the recommendation information from plural search sites that are different in search range in accordance with a type of the recommendation information when a user selects the searchable recommendation information; and
    means for displaying
        a site corresponding to a URL when metadata corresponding to the selected searchable recommendation information includes the URL, and
        a search dialog including each of the determined at least one search site as the at least one candidate as an option to perform the web searching of the recommendation information using the search site corresponding to the respective candidate when the metadata corresponding to the selected searchable recommendation information does not include the URL.

2. The information processing apparatus according to claim 1, wherein the search display control means determines the at least one search site as the at least one candidate in accordance with a genre of the recommendation information.

3. The information processing apparatus according to claim 2, wherein the search display control means determines the at least one search site as the at least one candidate to include one of the plural search sites in which a search range is limited to a specific range corresponding to the genre of the recommendation information.

4. An information processing method, comprising:
    displaying recommendation information, which relates to a recorded program, which is obtained in advance, and which is included in the program, and displaying, when the recommendation information is searchable by web searching, a notification describing that the recommendation information is searchable by the web searching along with the recommendation information in a reproduction instruction screen;
    displaying, when metadata corresponding to the searchable recommendation information includes a URL and a user selects the searchable recommendation information, a site corresponding to the URL;
    determining, when the metadata does not include the URL, at least one search site as at least one candidate to perform the web searching of the recommendation information from plural search sites that are different in search range in accordance with a type of the recommendation information; and displaying, when the metadata does not include the URL, a search dialog including each of the determined at least one search site as the at least one candidate as an option to perform the web searching of the recommendation information using the search site corresponding to the respective candidate.

5. A non-transitory computer-readable storage medium having embedded therein a program that when executed by a computer, causes the computer to execute a method comprising:

displaying recommendation information, which relates to a recorded program, which is obtained in advance, and which is included in the program, and displaying, when the recommendation information is searchable by web searching, a notification describing that the recommendation information is searchable by the web searching along with the recommendation information in a reproduction instruction screen;

displaying, when metadata corresponding to the searchable recommendation information includes a URL and a user selects the searchable recommendation information, a site corresponding to the URL;

determining, when the metadata does not include the URL, at least one search site as at least one candidate to perform the web searching of the recommendation information from plural search sites that are different in search range in accordance with a type of the recommendation information; and displaying, when the metadata does not include the URL, a search dialog including each of the determined at least one search site as the at least one candidate as an option to perform the web searching of the recommendation information using the search site corresponding to the respective candidate.

6. An information processing apparatus, comprising:

a program information display controller configured to
display recommendation information, which relates to a recorded program, which is obtained in advance, and which is included in the program, and
display, when the recommendation information is searchable by web searching, a notification describing that the recommendation information is searchable by the web searching along with the recommendation information; and a search display controller configured to
determine if metadata corresponding to the searchable recommendation information includes a URL when a user selects the searchable recommendation information,
display a site corresponding to the URL when it is determined that the metadata includes the URL, and
determine, when it is determined that the metadata does not include the URL, at least one search site as at least one candidate to perform the web searching of the recommendation information from plural search sites that are different in search range in accordance with a type of the recommendation information, and to display a search dialog including each of the determined at least one search site as the at least one candidate as an option to perform the web searching of the recommendation information using the search site corresponding to the respective candidate.

7. The information processing apparatus according to claim 6, wherein the search display controller is configured to determine the at least one search site as the at least one candidate in accordance with a genre of the recommendation information.

8. The information processing apparatus according to claim 6, wherein the search display controller is configured to determine the at least one search site as the at least one candidate to include one of the plural search sites in which a search range is limited to a specific range corresponding to the genre of the recommendation information.

9. The information processing apparatus according to claim 6, wherein the search display controller is configured to display the search dialog in which the recommendation information is automatically inputted when the user selects the searchable recommendation information.

10. The information processing apparatus according to claim 6, wherein the search display controller is configured to determine the at least one search site as the at least one candidate from the plural search sites that include at least one of a product-selling search site, an auction search site or a restaurant search site.

* * * * *